United States Patent
Kim et al.

(10) Patent No.: US 11,706,646 B2
(45) Date of Patent: Jul. 18, 2023

(54) METHOD AND APPARATUS FOR PERFORMING RADIO RESOURCE MANAGEMENT (RRM) MEASUREMENT IN WIRELESS COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 17/060,030

(22) Filed: Sep. 30, 2020

(65) Prior Publication Data

US 2021/0105643 A1   Apr. 8, 2021

(30) Foreign Application Priority Data

Oct. 2, 2019 (KR) .................. 10-2019-0122643
Nov. 6, 2019 (KR) .................. 10-2019-0140719
Nov. 22, 2019 (KR) ................ 10-2019-0151485

(51) Int. Cl.
*H04W 24/08* (2009.01)
*H04W 24/10* (2009.01)
(Continued)

(52) U.S. Cl.
CPC .......... *H04W 24/08* (2013.01); *H04L 5/0053* (2013.01); *H04W 24/10* (2013.01);
(Continued)

(58) Field of Classification Search
None
See application file for complete search history.

(56) References Cited

U.S. PATENT DOCUMENTS

2015/0358890 A1* 12/2015 Xu .................. H04W 48/16
                                                          455/437
2016/0112149 A1    4/2016 Kim et al.
(Continued)

FOREIGN PATENT DOCUMENTS

WO   WO-2020202513 A1 * 10/2020
WO   WO-2021066447 A1 *  4/2021

OTHER PUBLICATIONS

International Search Report and Written Opinion of the International Searching Authority in connection with International Application No. PCT/KR2020/013124, dated Dec. 30, 2020, 10 pages.
(Continued)

*Primary Examiner* — Faruk Hamza
*Assistant Examiner* — Cassandra L Decker

(57) ABSTRACT

A method for performing frequency measurement by a terminal in a wireless communication system is provided. The method comprises receiving, from a base station, system information comprising first configuration information associated with frequency measurement and second configuration information associated with relaxed frequency measurement; determining whether to perform measurement on at least one frequency based on the first configuration information; determining whether to perform relaxed measurement for the at least one frequency based on the second configuration information according to a result of the determining whether to perform the measurement; and performing the relaxed measurement for the at least one frequency based on a result of the determining whether to perform the relaxed measurement.

13 Claims, 18 Drawing Sheets

(51) Int. Cl.
  *H04L 5/00* (2006.01)
  *H04W 48/16* (2009.01)
  *H04W 36/00* (2009.01)
  *H04W 48/12* (2009.01)
  *H04W 52/02* (2009.01)
  *H04W 76/27* (2018.01)

(52) U.S. Cl.
  CPC ....... *H04W 36/0094* (2013.01); *H04W 48/16* (2013.01); *H04W 52/0209* (2013.01); *H04W 76/27* (2018.02); *H04L 5/0007* (2013.01); *H04W 48/12* (2013.01)

(56) References Cited

U.S. PATENT DOCUMENTS

| | | | |
|---|---|---|---|
| 2018/0109987 | A1 | 4/2018 | Xu et al. |
| 2018/0323884 | A1* | 11/2018 | Ku ........................ H04W 24/08 |
| 2018/0332532 | A1* | 11/2018 | Johansson ............ H04W 76/27 |
| 2019/0069192 | A1* | 2/2019 | Palenius ............... H04W 76/28 |
| 2019/0320490 | A1* | 10/2019 | Liu ................... H04W 72/1289 |
| 2020/0029256 | A1* | 1/2020 | Rico Alvarino .... H04W 68/005 |
| 2020/0367195 | A1* | 11/2020 | Selvaganapathy .... H04W 36/08 |
| 2021/0105649 | A1* | 4/2021 | Lee ...................... H04W 76/27 |
| 2021/0167874 | A1* | 6/2021 | Jiang ................. H04W 36/0088 |
| 2021/0258884 | A1* | 8/2021 | Sano ..................... H04W 52/38 |
| 2021/0377829 | A1* | 12/2021 | Wang ................ H04W 36/0088 |
| 2022/0095134 | A1* | 3/2022 | Shi ..................... H04W 72/0453 |
| 2022/0167202 | A1* | 5/2022 | Su ........................ H04L 5/0051 |

OTHER PUBLICATIONS

Samsung, "On Triggering Relaxed RRM measurement in RRC_Idle and RRC_Inactive," R2-1909172, 3GPP TSG-RAN WG2 Meeting #107, Prague, Czech Republic, Aug. 26-30, 2019, 5 pages.
LG Electronics Inc, "RRM measurement relaxation on a frequency based on the cell quality," R2-1911299, 3GPP TSG-RAN WG2 Meeting #107, Prague, Czech Republic, Aug. 26-30, 2019, 3 pages.
CMCC, "Discussion on power saving in inter-frequency measurements," R2-1905937, Revision of R2-1904329, 3GPP TSG-RAN WG2 Meeting #106, Reno, NV, USA, May 12-16, 2019, 5 pages.
MediaTek Inc., "Report of email discussion [105bis#29][NR/Power Saving] RRM solutions", 3GPP TSG-RAN WG2 Meeting #106, May 13-17, 2019, R2-1908249, 20 pages.
Vivo et al., "RRM relaxation for high priority frequency", 3GPP TSG-RAN WG2 Meeting #111-e, Aug. 17-28, 2020, R2-2006686, 6 pages.
Sony, "Details of Relaxed monitoring for NR UE power saving", 3GPP TSG RAN WG2 Meeting#108, Nov. 18-22, 2019, R2-1915234, 4 pages.
Supplementary European Search Report dated Aug. 12, 2022 in connection with European Patent Application No. 20 87 1973, 12 pages.

* cited by examiner

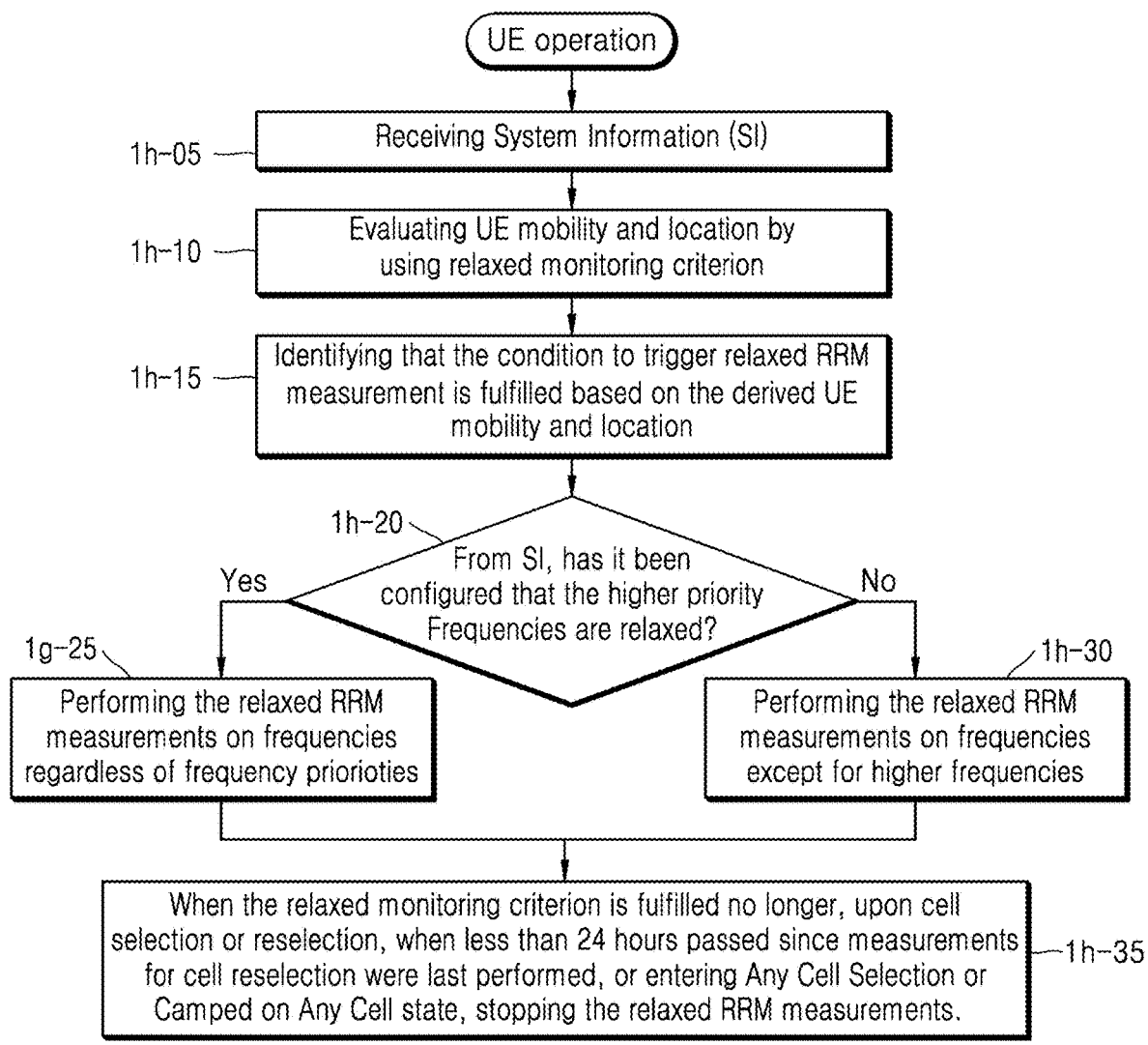

METHOD AND APPARATUS FOR PERFORMING RADIO RESOURCE MANAGEMENT (RRM) MEASUREMENT IN WIRELESS COMMUNICATION SYSTEM

CROSS-REFERENCE TO RELATED APPLICATIONS

This application is based on and claims priority under 35 U.S.C. § 119 to Korean Patent Application No. 10-2019-0122643 filed on Oct. 2, 2019, Korean Patent Application No. 10-2019-0140719 filed on Nov. 6, 2019, and Korean Patent Application No. 10-2019-0151485 filed on Nov. 22, 2019 in the Korean Intellectual Property Office, the disclosures of which are herein incorporated by reference in their entirety.

BACKGROUND

1. Field

The disclosure relates to a method and apparatus for performing radio resource management (RRM) measurement in a wireless communication system.

In addition, the disclosure relates to a next-generation mobile communication system. More particularly, the disclosure relates to a method and apparatus for performing stepwise measurement to save power of a user equipment (UE) in a next-generation mobile communication system.

2. Description of Related Art

To meet the increasing demand for wireless data traffic after the commercialization of $4^{th}$ generation (4G) communication systems, efforts to develop enhanced $5^{th}$ generation (5G) communication systems or pre-5G communication systems are continuing. For this reason, a 5G communication system or pre-5G communication system is called a 'beyond 4G network' communication system or a 'post long term evolution (post-LTE)' system.

To achieve a high data rate, the implementation of a 5G communication system in an ultra-high-frequency millimeter wave (mmWave) band (for example, a 60 GHz band) is being considered. To reduce path loss of radio waves and increase a transfer distance of radio waves in an ultra-high-frequency band, in a 5G communication system, technologies for beamforming, massive multiple input multiple output (MIMO), full dimensional MIMO (FD-MIMO), array antenna, analog beam-forming, and large-scale antenna are being discussed.

Also, to improve system networks, various technologies, such as evolved small cell, advanced small cell, cloud radio access network (cloud RAN), ultra-dense networks, device-to-device (D2D) communication, wireless backhaul, moving networks, cooperative communication, coordinated multi-points (CoMP), and interference cancellation, have been developed for 5G communication systems.

In addition, hybrid frequency shift keying (FSK) and quadrature amplitude (QAM) modulation (FQAM) and sliding window superposition coding (SWSC) based on advanced coding modulation (ACM), and filter bank multi carrier (FBMC), non-orthogonal multiple access (NOMA) and sparse code multiple access (SCMA) based on advanced access technology have been developed for 5G communication systems.

Meanwhile, the Internet is evolving from a human-centered network in which humans generate and consume information to an Internet of things (IoT) network in which distributed components such as objects transmit, receive, and process information. Internet of everything (IoE) technology resulting from combining IoT technology with big data processing technology, etc. through connection to a cloud server or the like is on the rise. To implement the IoT, various technical factors, such as sensing technology, wired/wireless communication, network infrastructure, service interface technology, and security technology, are required. Recently, technologies including a sensor network, machine-to-machine (M2M), and machine type communication (MTC) for connections between objects have been studied. In an IoT environment, an intelligent Internet technology (IT) service is provided to collect and analyze data generated by connected objects to create new value for human life. The IoT may be applied to various fields, such as smart homes, smart buildings, smart cities, smart cars/connected cars, smart grids, health care, smart appliances, and advanced medical services, through convergence and combination between existing Information technology (IT) and various industries.

Accordingly, various attempts to apply a 5G communication system to an IoT network are being made. For example, technologies, such as a sensor network, M2M, and MTC, are implemented by technologies, such as beam forming, MIMO, and array antenna, which are 5G communication technologies. Applying a cloud radio access network (cloud RAN) as big data processing technology is also an example of the convergence of 5G technology and IoT technology.

With the development of the above-described technologies and mobile communication systems, various services are being provided. Particularly, a method for reducing user equipment (UE) power consumption for cell measurement is required.

SUMMARY

The disclosure provides a method and apparatus for performing relaxed radio resource management (RRM) measurement on a cell based on a mobility state of a user equipment (UE) and a location of the UE in a wireless communication system.

In addition, the disclosure provides a method and apparatus for saving power of a user equipment (UE) upon measurement by proposing a stepwise measurement operation of the UE. Particularly, the disclosure provides a method and apparatus for efficiently reducing power consumption of a UE by proposing a criterion for relaxed measurement for each parameter provided for radio resource management (RRM) measurement for each of intra-frequencies measurement and inter-frequencies measurement.

In accordance with an aspect of the disclosure, a method for performing frequency measurement by a terminal in a wireless communication system is provided. The method comprises: receiving, from a base station, system information comprising first configuration information associated with frequency measurement and second configuration information associated with relaxed frequency measurement; determining whether to perform measurement on at least one frequency based on the first configuration information; determining whether to perform relaxed measurement for the at least one frequency based on the second configuration information according to a result of the determining whether to perform the measurement; and performing the relaxed measurement for the at least one frequency based on a result of the determining whether to perform the relaxed measurement.

In an embodiment, the determining whether to perform the relaxed measurement for the at least one frequency based on the second configuration information according to the result of determining whether to perform the measurement comprises determining whether to perform the relaxed measurement for the at least one frequency based on determining to perform the measurement on the at least one frequency.

In an embodiment, the first configuration information associated with the frequency measurement comprises at least one of a threshold value $S_{IntraSearchP}$ for a cell selection receive level value (Srxlev) for an intra-frequency, a threshold value $S_{IntraSearchQ}$ for a cell selection quality value (Squal) for the intra-frequency, a threshold value $S_{nonIntraSearchP}$ for the Srxlev for an inter-frequency or an inter-radio access technology (inter-RAT) frequency, or a threshold value $S_{nonIntraSearchQ}$ for the Squal for the inter-frequency or the inter-RAT frequency.

In an embodiment, the determining whether to perform frequency measurement on the at least one frequency based on the first configuration information comprises determining not to perform frequency measurement for the intra-frequency in case that an Srxlev of a serving cell of the terminal is greater than the $S_{IntraSearchP}$ and an Squal of the serving cell is greater than the $S_{IntraSearchQ}$.

In an embodiment, the determining whether to perform frequency measurement on the at least one frequency based on the first configuration information comprises determining not to perform frequency measurement for the inter-frequency of the inter-RAT frequency in case that an Srxlev of a serving cell of the terminal is greater than the $S_{nonIntraSearchP}$ and an Squal of the serving cell is greater than the $S_{nonIntraSearchQ}$.

In an embodiment, the second configuration information for the relaxed frequency measurement comprises at least one of third configuration information associated with a criterion for the terminal with low mobility (low mobility criterion) or fourth configuration information associated with a criterion for the terminal not at cell edge (not at cell edge criterion), the third configuration information comprises a threshold value $S_{SearchDeltaP}$ for variation of a cell selection receive level value (Srxlev), and the fourth configuration information comprises at least one of a threshold value $S_{SearchThresholdP}$ for the Srxlev for relaxed frequency measurement or a threshold value $S_{SearchThresholdQ}$ for a cell selection quality value (Squal) for relaxed frequency measurement.

In an embodiment, the low mobility criterion is that a value obtained by subtracting an Srxlev of a serving cell of the terminal from a reference Srxlev (Srxlev$_{Ref}$) of the serving cell is less than the $S_{SearchDeltaP}$, and the not at cell edge criterion is that the Srxlev of the serving cell is greater than the $S_{SearchThresholdP}$ and that in case that the $S_{SearchThresholdQ}$ is included in the fourth configuration information, an Squal of the serving cell is greater than the $S_{SearchThresholdQ}$.

In an embodiment, a current Srxlev of the serving cell is determined as the Srxlev$_{Ref}$ of the serving cell in case that the terminal selects or reselects a new cell, the current Srxlev of the serving cell is greater than a current reference Srxlev$_{Ref}$ of the serving cell, or at least one criterion of the low mobility criterion or the not cell edge criterion is not satisfied during an evaluation time ($T_{SearchDeltaP}$) received from the base station.

In an embodiment, the determining whether to perform the relaxed measurement for the at least one frequency based on the second configuration information comprises: in case that the third configuration information is included in the second configuration information and the fourth configuration information is not included, determining whether to perform the relaxed measurement for the at least one frequency based on whether the low mobility criterion is satisfied, in case that the third configuration information is not included in the second configuration information and the third configuration information is included, determining whether to perform the relaxed measurement for the at least one frequency based on whether the not at cell edge criterion is satisfied, and in case that the third configuration information and the fourth configuration information are included in the second configuration information, determining whether to perform the relaxed measurement for the at least one frequency based on whether at least one criterion of the low mobility criterion or the not at cell edge criterion is satisfied.

In an embodiment, the second configuration information further comprises information of an evaluation time $T_{SearchDeltaP}$, and the determining whether to perform the relaxed measurement for the at least one frequency based on the second configuration information comprises determining whether to perform the relaxed measurement for the at least one frequency based on whether at least one criterion of the low mobility criterion or the not cell edge criterion is satisfied during $T_{SearchDeltaP}$.

In an embodiment, the second configuration comprises an indicator (highPriorityMeasRelax) indicating whether a measurement for a high priority frequency can be relaxed, and the determining whether to perform the relaxed measurement for the at least one frequency based on the second configuration information comprises determining whether to perform the relaxed measurement for a frequency having a higher priority than a frequency of a serving cell of the terminal based on the indicator.

In an embodiment, the performing the relaxed measurement for the at least one frequency comprises performing the relaxed measurement for the at least one frequency based on a first measurement period for the relaxed measurement, and the first measurement period is longer than a second measurement period for the measurement which is unrelaxed.

In accordance with another aspect of the disclosure, a method for transmitting configuration information associated with frequency measurement to a terminal by a base station in a wireless communication system is provided. The method comprises: transmitting, to a terminal, system information comprising first configuration information associated with frequency measurement and second configuration information associated with relaxed frequency measurement, wherein the first configuration information associated with the frequency measurement comprises at least one of a threshold value $S_{IntraSearchP}$ for a cell selection receive level value (Srxlev) for an intra-frequency, a threshold value $S_{IntraSearchQ}$ for a cell selection quality value (Squal) for the intra-frequency, a threshold value $S_{nonIntraSearchP}$ for the Srxlev for an inter-frequency or an inter-radio access technology (inter-RAT) frequency, or a threshold value $S_{nonIntraSearchQ}$ for the Squal for the inter-frequency or the inter-RAT frequency, wherein the second configuration information for the relaxed frequency measurement comprises at least one of third configuration information associated with a criterion for the terminal with low mobility (low mobility criterion) or fourth configuration information associated with a criterion for the terminal not at cell edge (not at cell edge criterion), wherein the second configuration further comprises information of an evaluation time $T_{SearchDeltaP}$ and an indicator (highPriorityMeasRelax) indicating whether a measurement for a high priority frequency can be relaxed, wherein the third configuration information comprises a threshold value $S_{SearchDeltaP}$ for variation of a cell selection receive level value (Srxlev), and wherein the fourth configuration information comprises at least one of a threshold value $S_{SearchThresholdP}$ for the Srxlev for relaxed frequency measurement or a threshold value $S_{SearchThresholdQ}$ for a cell selection quality value (Squal) for relaxed frequency measurement.

In accordance with another aspect of the disclosure, a terminal performing frequency measurement in a wireless communication system is provided. The terminal comprises a transceiver and at least one processor configured to: receive, from a base station, by controlling the transceiver, system information comprising first configuration information associated with frequency measurement and second configuration information associated with relaxed frequency measurement, determine whether to perform measurement on at least one frequency based on the first configuration information, determine whether to perform relaxed measurement for the at least one frequency based on the second configuration information according to a result of the determining whether to perform the measurement, and perform the relaxed measurement for the at least one frequency based on a result of the determining whether to perform the relaxed measurement.

In accordance with another aspect of the disclosure, a base station transmitting configuration information associated with frequency measurement to a terminal in a wireless communication system is provided. The base station comprises a transceiver and at least one processor configured to control the transceiver to transmit, to a terminal, system information comprising first configuration information associated with frequency measurement and second configuration information associated with relaxed frequency measurement, wherein the first configuration information associated with the frequency measurement comprises at least one of a threshold value $S_{IntraSearchP}$ for a cell selection receive level value (Srxlev) for an intra-frequency, a threshold value $S_{IntraSearchQ}$ for a cell selection quality value (Squal) for the intra-frequency, a threshold value $S_{nonIntraSearchP}$ for the Srxlev for an inter-frequency or an inter-radio access technology (inter-RAT) frequency, or a threshold value $S_{nonIntraSearchQ}$ for the Squal for the inter-frequency or the inter-RAT frequency, wherein the second configuration information for the relaxed frequency measurement comprises at least one of third configuration information associated with a criterion for the terminal with low mobility (low mobility criterion) or fourth configuration information associated with a criterion for the terminal not at cell edge (not at cell edge criterion), wherein the second configuration further comprises information of an evaluation time $T_{SearchDeltaP}$ and an indicator (highPriorityMeasRelax) indicating whether a measurement for a high priority frequency can be relaxed, wherein the third configuration information comprises a threshold value $S_{SearchDeltaP}$ for variation of a cell selection receive level value (Srxlev), and wherein the fourth configuration information comprises at least one of a threshold value $S_{SearchThresholdP}$ for the Srxlev for relaxed frequency measurement or a threshold value $S_{SearchThresholdQ}$ for a cell selection quality value (Squal) for relaxed frequency measurement.

Additional aspects will be set forth in part in the description which follows and, in part, will be apparent from the description, or may be learned by practice of the presented embodiments of the disclosure.

To overcome the above-described problems, there is provided a method of performing, by a user equipment (UE), measurement in a wireless communication system, the method including: receiving a first configuration information related to whether to stop measurement and a second configuration information related to whether to perform relaxed measurement from a base station; determining whether a condition determined by the first configuration information is fulfilled; determining, when the condition determined by the first configuration information is not fulfilled such that the UE fails to stop measurement, whether a condition determined by the second configuration information is fulfilled; and performing relaxed measurement when the condition determined by the second configuration information is fulfilled.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1H illustrates a flowchart showing a UE operation of determining inter-frequency/inter-RAT frequency relaxed RRM measurement at a high-priority frequency, according to an embodiment of the disclosure;

DETAILED DESCRIPTION

Figure 1A:
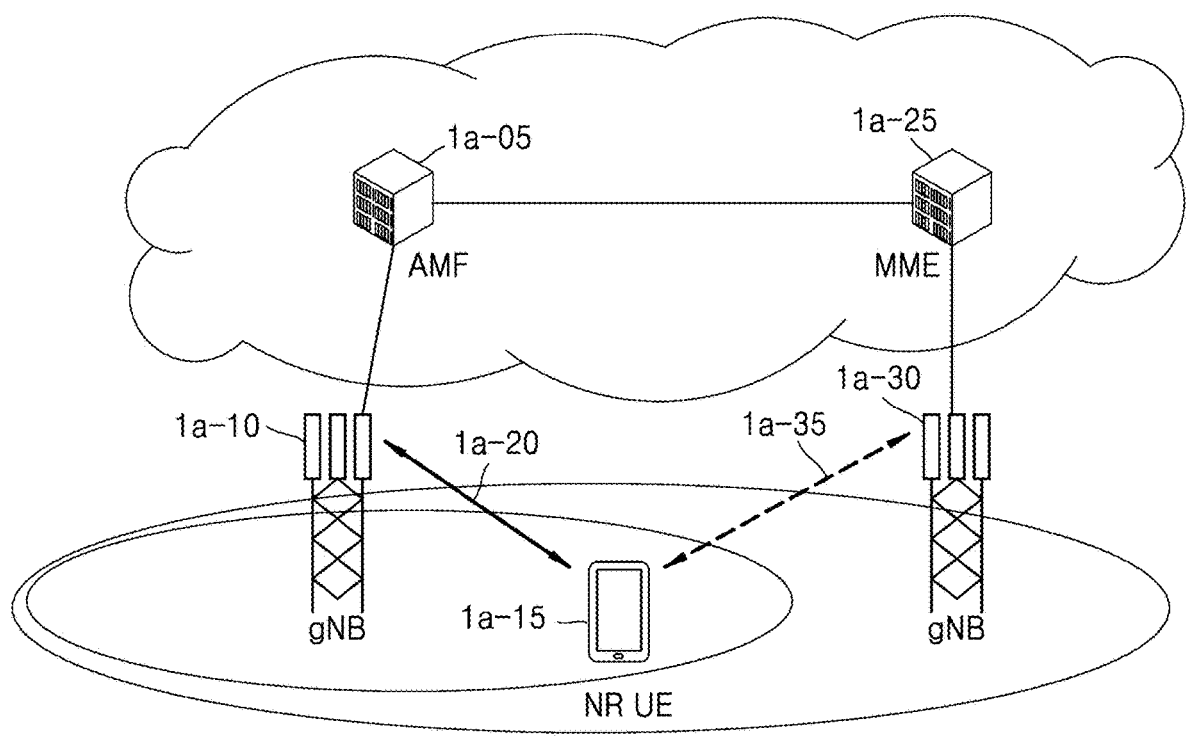
FIG. 1A shows a structure of a next-generation mobile communication system according to an embodiment of the disclosure.

FIGS. 1A through 2H, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

When the embodiments are described, descriptions about technical content well known in the technical field to which the disclosure belongs and not directly related to the disclosure will be omitted. The reason for this is to more clearly convey, without obscuring, the gist of the disclosure by omitting unnecessary descriptions.

For the same reason, some components of the accompanying drawings may be exaggeratedly shown, omitted, or schematically shown. Also, the sizes of the components do not completely reflect their actual sizes. The same or corresponding components in the drawings are assigned like reference numerals.

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like elements throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to an embodiment of the disclosure, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more Central Processing Units (CPUs) in a device or a security multimedia card. Also, in the embodiments, the 'portion', 'module' or 'unit' may include one or more processors.

Hereinafter, an operation principle of the disclosure will be described in detail with reference to the accompanying drawings. However, when detailed descriptions about known functions or configurations associated with the disclosure are determined to unnecessarily obscure the gist of the disclosure, the detailed descriptions will be omitted. Although the following terms are defined in consideration of the functions of the disclosure, they may vary according to a user or operator's intentions, judicial precedents, etc. Hence, the terms must be defined based on the contents of the entire specification. Hereinafter, a base station (BS), which is a subject for assigning resources to UEs, may be at least one of gNode B, eNode B, Node B, a wireless connection unit, a base station controller, or a node on a network. A terminal may include a UE, a mobile station (MS), a cellular phone, a smartphone, a computer, or a multimedia system capable of performing a communication function. However, the base station and the terminal are not limited to the above-described examples.

Hereinafter, the disclosure describes technology, performed by a UE, of receiving broadcast information from a base station in a wireless communication system. The disclosure relates to a communication method and system for the convergence of IoT technology and a 5G communication system for supporting a higher data rate than beyond 4G systems. The disclosure may be applied to intelligent services (for example, smart homes, smart buildings, smart cities, smart cars/connected cars, health care, digital education, retail business, security and safety related services, etc.) based on 5G communication technology and IoT-related technology.

As used herein, the term indicating broadcast information, the term indicating control information, the term related to communication coverage, the term (for example, an event) indicating a state change, the term indicating network entities, the term indicating messages, the term indicating device components, etc. are examples for convenience of description. Accordingly, the disclosure is not limited to the terms which will be described later, and other terms having equivalent technical meanings may be used.

Hereinafter, for convenience of description, some of terms and names defined in the $3^{rd}$ Generation Partnership Project Long Term Evolution (3GPP LTE) standard or the 3GPP New Radio (3GPP NR) may be used. However, the disclosure is not limited to the above-mentioned terms and names, and may also be applied to systems based on other specifications.

Wireless communication systems have passed initial stages of providing voice-based services, and are being developed to wide-band wireless communication systems of providing high-speed, high-quality packet data services, such as, for example, High Speed Packet Access (HSPA) of the 3GPP, LTE or Evolved Universal Terrestrial Radio Access (E-UTRA), LTE-Advanced (LTE-A), LTE-Pro, High Rate Packet Data (HRPD) of the 3GPP2, Ultra Mobile Broadband (UMB), and communication standards of the IEEE 802.16e and the like.

A representative example of the wide-band wireless communication systems is an LTE system. The LTE system adopts an Orthogonal Frequency Division Multiplexing (OFDM) method in a downlink (DL), and a Single Carrier Frequency Division Multiple Access (SC-FDMA) method in an uplink (UL). The uplink means a wireless link through which a UE or a MS transmits data or control signals to eNode B or a base station (BS), and the downlink means a wireless link through which eNode B or a base station transmits data or control signals to a UE or a MS. A multiple access method assigns and operates time-frequency resources through which data or control information is transmitted for individual users such that the time-frequency resources do not overlap, that is, such that orthogonality is fulfilled, thereby distinguishing data or control information of the individual users from each other.

Future communication systems beyond the LTE, that is, 5G communication systems need to freely reflect various requirements from users, service providers, etc., and therefore, the 5G communication systems need to support services fulfilling various requirements. Services considered for 5G communication systems include Enhanced Mobile BroadBand (eMBB), massive Machine Type Communication (mMTC), Ultra Reliability Low Latency Communication (URLLC), etc.

According to an embodiment of the disclosure, eMBB is aimed to provide a more enhanced data rate than that supported by existing LTE, LTE-A or LTE-Pro. For example, in a 5G communication system, eMBB needs to provide a peak data rate of 20 giga-bits per second (Gbps) in a downlink and a peak data rate of 10 Gbps in an uplink with respect to a base station. Also, eMBB needs to provide a high user perceived data rate. To fulfill the requirements, the 5G communication system requires an improvement of transmission/reception technologies including enhanced Multi Input Multi Output (MIMO) transmission technology. Also, existing LTE transmits signals by using a transmission bandwidth of 20 MHz in a 20 GHz band, whereas the 5G communication system uses a wider frequency bandwidth than 20 MHz in a frequency band of 3 to 6 GHz or more, thereby fulfilling a required data rate.

Also, mMTC is considered to support application services such as Internet of Thing (IoT) in the 5G communication system. The mMTC may require supporting connections to massive UEs in a cell, UE coverage enhancement, an improved battery lifetime, UE cost reduction, etc. to efficiently provide the IoT. The IoT is connected to various sensors and devices to provide a communication function. Therefore, a large number of UEs (for example, 1,000,000 UEs/km$^2$) in a cell need to be supported in the mMTC system. Also, because a UE supporting the mMTC has a high probability of being located in a shadow zone such as the basement of a building, which is not covered by a cell, due to its service characteristics, for mMTC service, wide coverage compared to those required by other services that 5G communication systems provide may be required. The UE supporting the mMTC needs to be a low-cost UE, and requires a long battery lifetime because it has difficulties in frequently replacing the batteries.

Finally, URLLC which is a mission-critical cellular-based wireless communication service may be used in remote control for robots or machinery, industrial automation, unmanned aerial vehicle, remote health care, emergency alert, etc. Accordingly, communication provided by the URLLC may need to satisfy ultra-low latency and ultra-reliability. For example, a service supporting the URLLC needs to satisfy air interface latency that is shorter than 0.5 milliseconds, and also, the service has a requirement of a packet error rate that is equal to or lower than $10^{-5}$. Accordingly, for services supporting the URLLC, the 5G system needs to provide a smaller Transmit Time Interval (TTI) than other services, and also, the 5G system requires a design of assigning a wide resource in a frequency band. However, the mMTC, URLLC, and eMBB as described above are examples of different service types, and service types to which the disclosure is applied are not limited to the above-described examples.

The services considered in the 5G communication system need to converge based on a framework and be provided. That is, for efficient resource management and control, the services may be integrated into one system and controlled and transmitted by the system, instead of being operated independently.

Also, hereinafter, embodiments of the disclosure are described based on examples of LTE, LTE-A, LTE Pro, or NR system, however, the embodiments of the disclosure may be applied to other communication systems having similar technical backgrounds or channel types. Also, the embodiments of the disclosure may be applied to other communication systems through slight modifications within a range that does not greatly deviate from the scope of the disclosure, under a determination of a person having a skilled technical knowledge.

FIG. 1A shows a structure of a next-generation mobile communication system according to an embodiment of the disclosure.

Referring to FIG. 1A, a radio access network of a next-generation mobile communication system (New Radio (NR)) may be configured with a next-generation New Radio Node B (NR gNB) (hereinafter, referred to as a gNB) 1a-10 and an Access and Mobility Management Function (AMF) 1a-05 which is an entity in a New Radio Core Network (NR CN). A New Radio User Equipment (hereinafter, referred to as a NR UE or UE) 1a-15 may be connected to an external network through the gNB 1a-10 and the AMF 1a-05.

The gNB 1a-10 may correspond to an Evolved Node B (eNB) of an existing LTE system.

The gNB 1a-10 may be connected to the NR UE 1a-15 through a wireless channel 1a-20, and provide a more excellent service than an existing node B. In the next-generation mobile communication system, because all user traffics are serviced through a shared channel, a device for performing scheduling by collecting status information of UEs, such as buffer statuses of UEs, available transmission power states of UEs, channel states of UEs, etc., is needed. The gNB 1a-10 may function as such a device. A NR gNB may generally control a plurality of cells. In the disclosure, a cell controlled by the gNB 1a-10 may indicate the corresponding gNB 1a-10. To implement ultra-high-speed data transmission compared to existing LTE systems, the next-generation mobile communication system may use an existing maximum bandwidth or more, use Orthogonal Frequency Division Multiplexing (OFDM) as air interface technology, or combine the OFDM with beam-forming technology. Also, the next-generation mobile communication system may apply Adaptive Modulation & Coding (hereinafter, referred to as AMC) of determining a modulation scheme and a channel coding rate according to a channel state of a UE. The AMF 1a-05 may perform functions, such as mobility support, bearer configuration, Quality of Service (QoS) configuration, etc. The AMF 1a-05 may be in charge of various control functions, as well as a mobility management function for UEs, and may be connected to a plurality of gNBs. Also, the next-generation mobile communication system may interwork with existing LTE systems, and the AMF 1a-05 may be connected to a Mobility Management Entity (MME) 1a-25 through a network interface. The MME 1a-25 may be connected to an eNB 1a-30 which is an existing gNB. A UE supporting LTE-NR Dual Connectivity may be connected to the eNB 1a-30, as well as the gNB 1a-10, to transmit and receive data (1a-35).

Figure 1B:
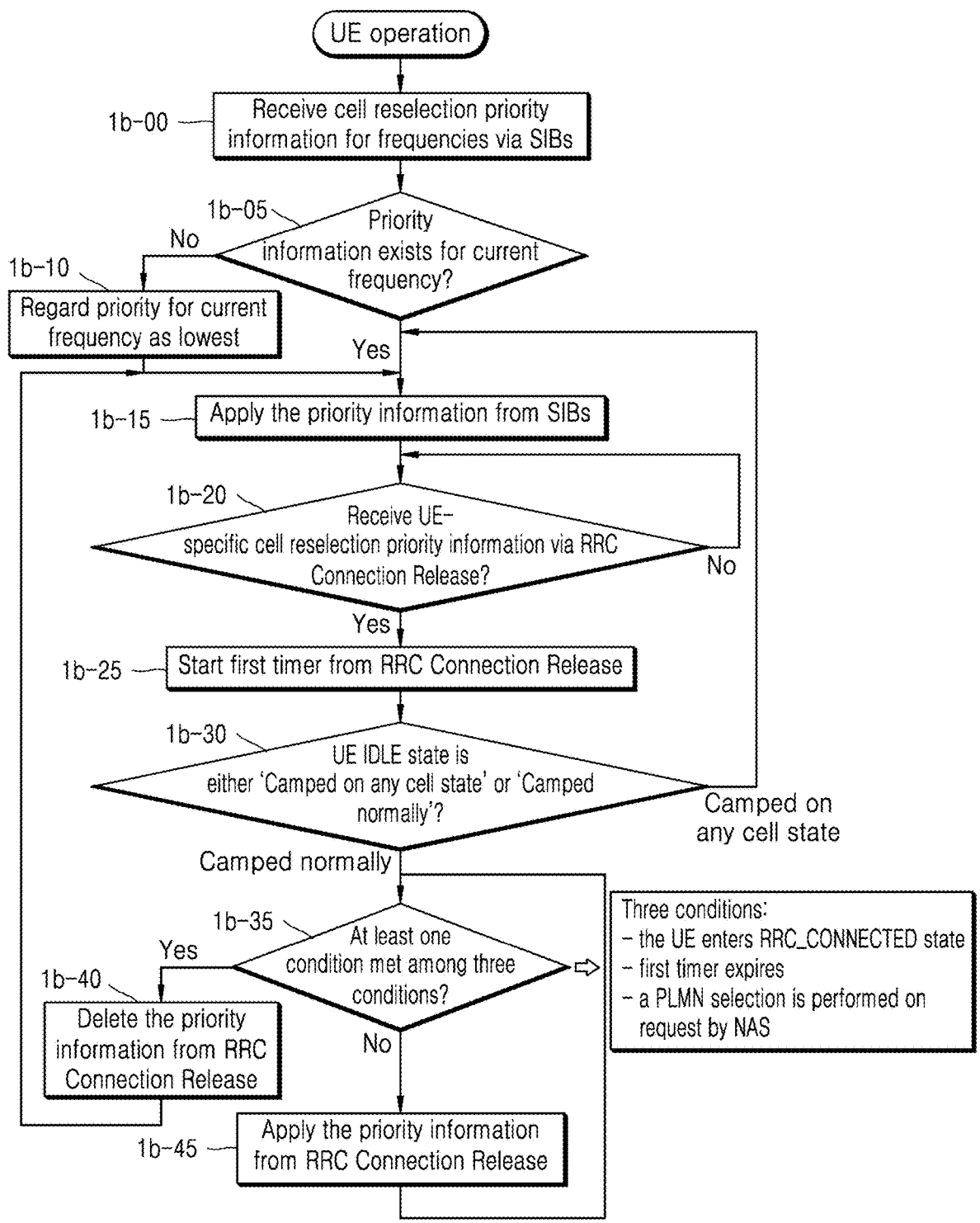
FIG. 1B illustrates a view for describing processes that cell reselection priority information for frequencies is broadcasted via at least one system information block (SIB) or the cell reselection priority information for frequencies is applied to a user equipment (UE) through a radio resource control (RRC) connection release message which is dedicated RRC signaling, according to an embodiment of the disclosure.

FIG. 1B illustrates a view for describing processes that cell reselection priority information for frequencies is broadcasted via at least one System Information Block (SIB) or the cell reselection priority information for frequencies is applied to a UE through a Radio Resource Control (RRC) Connection Release message which is dedicated RRC signaling, in a LTE system according to an embodiment of the disclosure.

Cell reselection is a process of reselecting a serving cell such that a moving UE is connected to a cell being in a most stable channel state. A network may assign priorities to frequencies to control cell reselection of UEs being in an IDLE mode. For example, when a UE receives priority information for two frequencies f1 and f2 and the frequency f1 has a priority higher than the frequency f2, there is high probability that the UE will stay at the frequency f1. Also, when a channel state of the frequency f2 is poor although the UE is at the frequency f2, the UE may attempt to change to the frequency f1.

Priority information for frequencies may be broadcasted through at least one SIB or provided to a specific UE through an RRC Connection Release message which is dedicated RRC signaling. When a UE already received priority information for frequencies through at least one SIB receives UE-specific priority information through RRC signaling, the UE may ignore the priority information of the at least one SIB. Priority information of each frequency may be transferred through cellReselectionPriority IE which will be described later, and each frequency may be assigned one of a total of X+1 levels of priorities. A smaller value means a lower priority. That is, '0' means a lowest priority.

| CellReselectionPriority information element |
| --- |
| -- ASN1START<br>-- TAG-CELLRESELECTIONPRIORITY-START<br>CellReselectionPriority ::=          INTEGER (0..7)<br>-- TAG-CELLRESELECTIONPRIORITY-STOP<br>-- ASN1STOP |

Radio Access Technology (RAT) frequencies may be not capable of being assigned the same priority. Equal priorities between RATs may be not supported. When an IDLE state of a UE is in a 'any cell selection state' or a 'camped on any cell state', the UE may apply frequency priority information received through at least one SIB, and store priority information received through RRC signaling without using the priority information received through the RRC signaling. The CellReselectionPriority IE, which is an optional IE, may not exist. When there is no CellReselectionPriority IE corresponding to a certain frequency, no priority information for the corresponding frequency may have been assigned. The UE may regard a priority of a frequency to which no priority information has been assigned, as a lowest level.

Referring to FIG. 1B, the UE may receive priority information for frequencies used in another RAT, as well as in Evolved Universal Terrestrial Radio Access (EUTRA), through at least one SIB, in operation 1b-00. However, priority information for all frequencies may be not necessarily provided. For example, priority information for a frequency of a currently camped serving cell may be not provided. In operation 1b-05, the UE may identify whether priority information for the frequency of the current serving cell exists. When no priority information for the frequency of the current serving cell is provided, the UE may regard a priority of the frequency of the current serving cell as a lowest level. The UE may apply the priority information for frequencies, in operation 1b-15.

When the UE receives an RRC Connection Release message from a gNB, the UE may convert a connection mode into an IDLE mode. The RRC Connection Release message may include frequency priority information. The frequency priority information included in the RRC Connection Release message may be UE-specific information, and may be applied, generally, more preferentially than frequency priority information received from at least one SIB. Accordingly, the UE may identify whether the RRC Connection Release message includes frequency priority information, in operation 1b-20. When the UE identifies that the RRC Connection Release message includes frequency priority information, the UE may apply a first time value included in the RRC Connection Release message to run a first timer, in operation 1b-25.

The UE may determine whether a state of the IDLE mode is a 'camped on any cell state' or a 'camped normally state', in operation 1b-30. The 'camped normally state' may indicate a state in which the UE camps on a 'suitable cell'. The 'suitable cell' may be a cell capable of providing normal services to the UE, and for example, the 'suitable cell' may be a cell fulfilling detailed conditions as follows.

Cell corresponding to a selected Public Land Mobile Network (PLMN), a registered PLMN, or a PLMN in an equivalent PLMN list
Cell not barred
Cell fulfilling a cell selection criterion
The 'camped on any cell state' may indicate a state in which the UE camps on an 'acceptable cell' because the UE fails to camp on a 'suitable cell'. On the 'acceptable cell', the UE may not use general services, although being capable of attempting an emergency call. The 'acceptable cell' may be a cell fulfilling, for example, conditions as follows.
Cell not barred
Cell fulfilling a cell selection criterion
When the UE is in the IDLE state 'camped on any cell', the UE may return to operation 1b-15 to apply the frequency priority information received via the at least one SIB, instead of applying the priority information received from the RRC Connection Release message. When the UE is in the IDLE state 'camped normally', the UE may determine whether at least one condition of three conditions below is fulfilled, in operation 1b-35. The three conditions may be as follows.
The UE enters the connection mode
The first time is expired
A PLMN selection process is performed according to a Non-access stratum (NAS) request
When any one condition of the three conditions is fulfilled, the UE may delete the priority information received from the RRC Connection Release message, in operation 1b-40, and return to operation 1b-15 to apply the frequency priority information received from the at least one SIB. Otherwise, when none condition is fulfilled, the UE may apply the priority information received from the RRC Connection Release message, in operation 1b-45.

The frequency priority information may influence the UE's measurement on a specific frequency. The UE may measure all frequencies having priorities higher than that of the current serving cell. However, the UE may not measure an intra-frequency of the serving cell, or frequencies having the same priority as the serving cell or lower priorities than the serving cell, to save UE power.

In regard of whether to perform measurement, the UE may determine to perform cell measurement when channel QoS of the serving cell is smaller than or equal to a predefined threshold value. Cell reselection may be performed for the UE to move to a cell being in a good channel state. When the channel QoS of the current serving cell is good, there is no reason that the UE will move to a frequency having the same priority or a lower priority. Accordingly, to reduce power consumption that is caused by unnecessary channel measurement, the UE may determine whether to perform measurement based on the predefined threshold value.

In the case of an intra-frequency, when QoS (that is, Srxlev or Squal) of the serving cell is equal to or lower than the predefined threshold value Sintrasearch (s-IntraSearchP and s-IntraSearchQ), the UE may perform channel measurement on other cells having the intra-frequency. The s-IntraSearchP may be a Reference Signals Received Power (RSRP)-based threshold value, and the s-IntraSearchQ may be a Reference Signal Received Quality (RSRQ)-based threshold value. When measured RSRP and RSRQ of the serving cell are greater than the predefined threshold value, the UE may not perform intra-frequency measurement.

In regard of an inter-frequency having the same or lower priority, when the QoS (that is, Srxlev or Squal) of the serving cell is the same as or lower than a predefined threshold value Snonintrasearch (s-NonIntraSearchP and s-NonIntraSearchQ), the UE may perform channel measurement on cells of the corresponding inter-frequency. The s-NonIntraSearchP may be a RSRP-based threshold value, and the s-NonIntraSearchQ may be a RSRQ-based threshold value.

When measured RSRP and RSRQ of the serving cell are greater than the predefined threshold value, the UE may not perform inter-frequency measurement.

In the disclosure, as a 'measurement state' of a UE, a state in which the UE performs channel measurement on an intra-frequency or an inter-frequency through comparison to threshold values may be defined as a 'normal measurement state', and the other state may be defined as a 'no measurement state'. However, the UE may continue to measure the serving cell regardless of the measurement states described above.

When the UE identifies that channel QoS of a cell on a high-priority frequency is higher than a predefined threshold value ThreshX-high, while performing measurement, the UE may reselect the cell of the high-priority frequency as a serving cell. When the UE identifies that channel QoS of a cell on a low-priority frequency is higher than a predefined threshold value ThreshX-low and the QoS of the serving cell is lower than ThresholdServing-low, the UE may reselect the cell on the low-priority frequency as a serving cell.

Figure 1C:
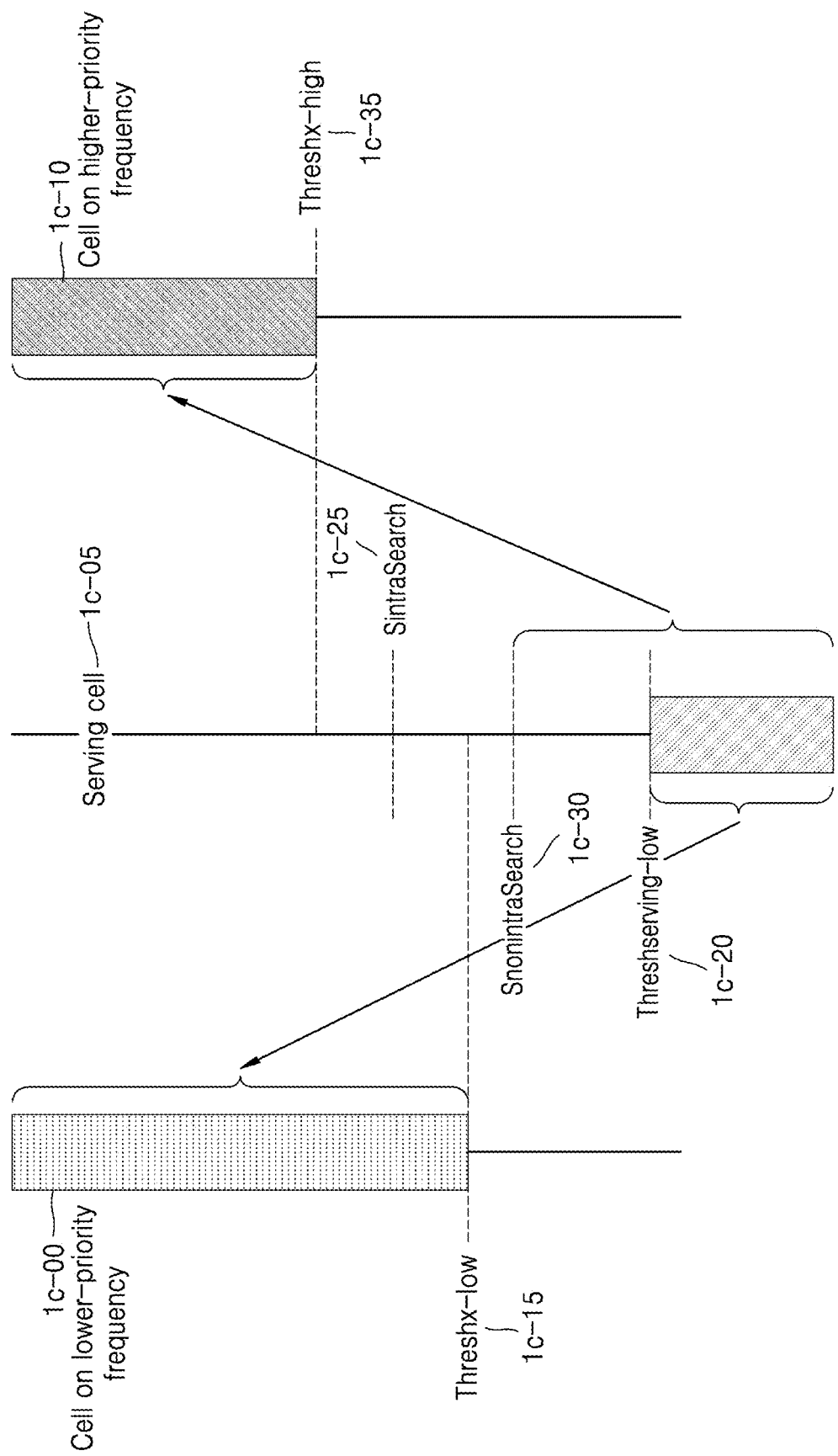
FIG. 1C illustrates a view for describing a method of performing cell reselection in a UE, according to an embodiment of the disclosure.

FIG. 1C illustrates a view for describing a method for performing cell reselection in a UE according to an embodiment of the disclosure.

Referring to FIG. 1C, the UE may perform inter-freq/RAT measurement on a high-priority frequency or RAT, regardless of a measured signal intensity of a serving cell. When the measured signal intensity of the serving cell is lower than SintaSearch 1c-25, the UE may perform intra-freq measurement. When the measured signal intensity of the serving cell is lower than SnonitraSearch 1c-30, the UE may perform inter-freq/RAT measurement on the same frequency as that of the current serving cell or a lower frequency than that of the current serving cell. A reason of triggering UE measurement in stages is to reduce power consumption of the UE, which is caused by measuring adjacent cells.

When channel QoS of a cell 1c-10 at a high-priority frequency is greater than a predefined threshold value ThreshX-high 1c-35, the UE may reselect the cell 1c-10 at the high-priority frequency as a serving cell. When channel QoS of a cell 1c-00 at a low-priority frequency is higher than a predefined threshold value ThreshX-low 1c-15 and QoS of the serving cell is lower than ThreshServing-low 1c-20, the UE may reselect the cell 1c-00 at the low-priority frequency as a serving cell.

Upon cell reselection, the UE may consider RSRP or RSRQ. The RSRP or RSRQ means a value (that is, Srxlev or Squal) calculated by S-criteria.

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

Various parameters including Srxlev and Squal may be defined as shown in Table 1 below.

TABLE 1

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 [3] (dB) |
| $Q_{rxlevmeas}$ | Measured cell RX level value (RSRP) |
| $Q_{qualmeas}$ | Measured cell quality value (RSRQ) |

TABLE 1-continued

| | |
|---|---|
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122 [9]. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122 [9]. |
| $P_{compensation}$ | If the UE supports the additionalPmax in the NR-NS-PmaxList, if present, in SIB1, SIB2 and SIB4: max($P_{EMAX1}$ - $P_{PowerClass}$, 0) - (min($P_{EMAX2}$, $P_{PowerClass}$) - min($P_{EMAX1}$, $P_{PowerClass}$)) (dB); else: max($P_{EMAX1}$ - $P_{PowerClass}$, 0) (dB) |
| $P_{EMAX1}$, $P_{EMAX2}$ | Maximum TX power level of a UE may use when transmitting on the uplink in the cell (dBm) defined as $P_{EMAX}$ in TS 38.101 [15]. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331 [3], else $P_{EMAX1}$ and $P_{EMAX2}$ are obtained from the p-Max and NR-NS-PmaxList respectively in SIB1, SIB2 and SIB4 for normal UL as specified in TS 38.331 [3]. |
| $P_{PowerClass}$ | Maximum RF output power of the UE (dBm) according to the UE power class as defined in TS 38.101-1 [15]. |

Figure 1D:
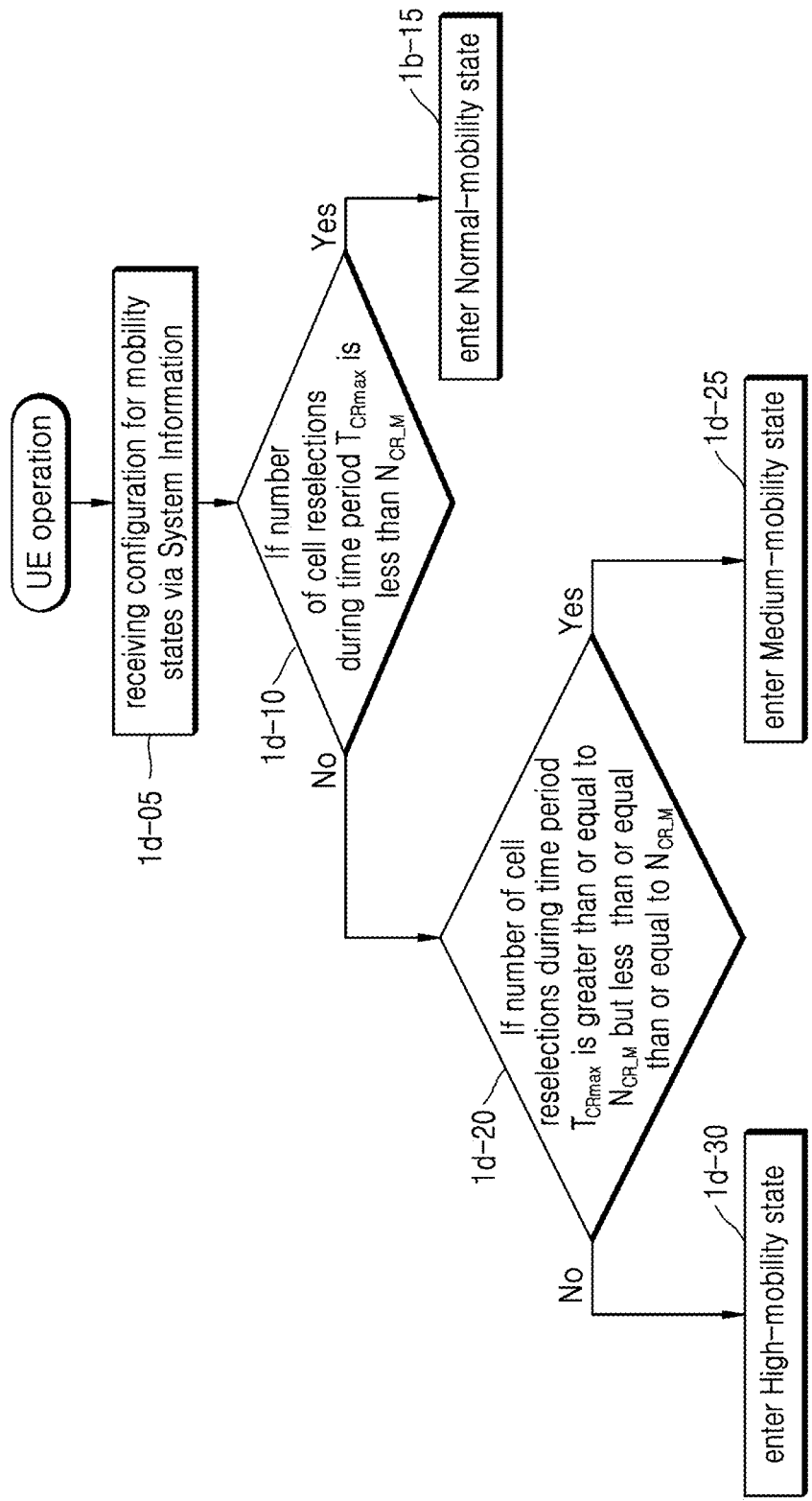
FIG. 1D illustrates a flowchart showing a UE operation of determining a mobility state, according to an embodiment of the disclosure.

FIG. 1D illustrates a flowchart showing a UE operation of determining a mobility state according to an embodiment of the disclosure.

Mobility states may be used to scale parameters related to cell reselection, such as $Q_{hyst}$, Treselection, etc. The mobility states may be divided into a Normal-mobility state, a Medium-mobility state, and a High-mobility state. Generally, the High-mobility state means a highest UE mobility. A mobility state may be determined by using a method which will be described with reference to operation 1d-05 to operation 1d-30 below.

Referring to FIG. 1D, in operation 1d-05, a UE may receive system information including configuration parameters required for determining a mobility state from a gNB. The configuration parameters may include $T_{CRmax}$, $N_{CR\_H}$, $N_{CR\_M}$ and $T_{CRmaxHyst}$. The $T_{CRmax}$ may be a time period for which the number of cell reselections is counted, and the $N_{CR\_H}$ and $N_{CR\_M}$ may be threshold values for the number of cell reselections for determining a mobility state. The $T_{CRmaxHyst}$ may be a time period, and when the UE fails to maintain a determination method of a determined mobility state during the time period $T_{CRmaxHyst}$, the UE may enter the Normal-mobility state. A mobility state estimation (MSE) procedure may be as follows.

In operation 1d-10, the UE may determine whether the number of cell reselections during the time period $T_{CRmax}$ is less than the threshold value $N_{CR\_M}$.

When the number of cell reselections during the time period $T_{CRmax}$ is less than the threshold value $N_{CR\_M}$, the UE may regard a current mobility state as the Normal-mobility state, in operation 1d-15.

In operation 1d-20, the UE may determine whether the number of cell reselections during the time period $T_{CRmax}$ is greater than or equal to the threshold value $N_{CR\_M}$ but smaller than or equal to the threshold value $N_{CR\_H}$.

When the number of cell reselections during the time period $T_{CRmax}$ is greater than or equal to the threshold value $N_{CR\_M}$ but smaller than or equal to the threshold value $N_{CR\_H}$, the UE may regard the current mobility state as the Medium-mobility state, in operation 1d-25.

When the number of cell reselections during the time period $T_{CRmax}$ is greater than the threshold value $N_{CR\_H}$, the UE may regard the current mobility state as the High-mobility state, in operation 1d-30. Hereinafter, a 'mobility determination method based on the number of cell reselections' may indicate the mobility determination method based on the number of cell reselections as described above with reference to operation 1d-05 to operation 1d-30 of FIG. 1D, although any additional descriptions are not provided.

In a next-generation mobile communication system, 'relaxed Radio Resource Management (RRM)' measurement is discussed to save power consumption of UEs. The relaxed RRM measurement is technology of reducing consumption power of UEs by applying a longer measurement period or reducing the number of cells or frequencies to be measured when a predefined condition is fulfilled. In a cellular mobile communication system, a main reason why a UE measures a cell is to support mobility of the UE. That is, in the cellular mobile communication system, an area to be serviced may be divided and distributed to a plurality of cells to provide UEs with services. Accordingly, when a moving UE approaches another cell, the cell providing a service may need to be changed from the current serving cell to the other cell that the UE approaches, at an appropriate time. The appropriate time at which the serving cell providing the service changes may be determined based on results of measurement on the serving cell and adjacent cells by the UE. Accordingly, a measurement operation that is performed by the UE may need to fulfill predefined requirements for ensuring mobility performance.

The relaxed RRM measurement may function to lower the predefined requirements for ensuring mobility performance. Accordingly, the relaxed RRM measurement may need to be configured under a condition that does not damage mobility performance. For example, when a UE moves fast or is located in an area such as a cell edge where cell reselection may occur, increasing a cell measurement period may delay a cell reselection time because a cell measurement result may fail to be acquired in time. That is, mobility performance may deteriorate.

The disclosure proposes a method of evaluating a moving speed and a location in cell of a UE through predefined mathematical formulas, and performing intra-/inter-/inter-RAT frequency relaxed RRM measurement.

Figure 1E:
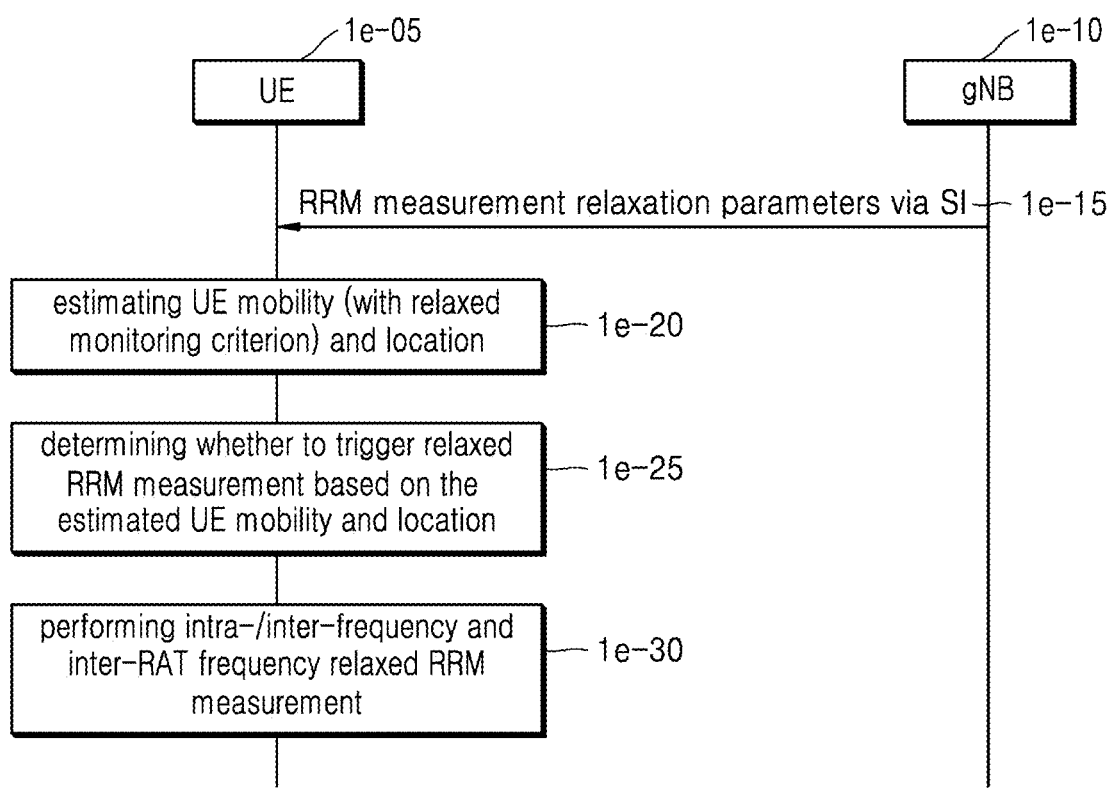
FIG. 1E illustrates a flowchart showing a process of performing relaxed radio resource management (RRM) measurement, according to an embodiment of the disclosure.

FIG. 1E illustrates a flowchart showing a process of performing relaxed RRM measurement according to an embodiment of the disclosure.

Referring to FIG. 1E, a UE 1e-05 according to an embodiment of the disclosure may receive system information including configuration parameters required for determining UE mobility and a UE location, from a gNB 1e-10, in operation 1e-15. The system information may include configuration parameters related to relaxed RRM measurement. The configuration parameters may be included in a single SIB or may be distributed and transferred through a plurality of SIBs according to their uses. SIB1 may include an indicator indicating whether a cell supports RRM measurement relaxation. Because SIB1 is broadcasted periodically and the UE 1e-05 needs to receive the SIB1 when reselecting a cell, an indicator indicating whether a cell supports RRM measurement relaxation may be included in the SIB1. When the UE 1e-05 received the SIB1 itself supports relaxed RRM measurement and the SIB1 includes an indicator indicating that a cell supports RRM measurement relaxation, the UE 1e-05 may receive other SIBs including other configuration parameters to trigger relaxed RRM measurement. The other SIBs excluding the SIB1 may be broadcasted aperiodically, unlike SIB1, and may be broadcasted according to a request from a UE.

In another method according to an embodiment of the disclosure, configuration parameters related to a relaxed monitoring criterion that is used to evaluate UE mobility and a UE location may be included in the SIB1 and transferred to the UE 1e-05. In this case, the configuration parameters related to the relaxed monitoring criterion may function as an indicator indicating that a cell supports RRM measurement relaxation, and therefore, there may be no indicator indicating that a cell supports RRM measurement relaxation. The configuration parameters related to the relaxed monitoring criterion will be described in detail, later.

According to an embodiment of the disclosure, the UE 1e-05 may apply the configuration parameters provided from the gNB 1e-10 to the predefined mathematical formulas to evaluate whether the UE stops or moves at a low speed and whether the UE is located in a cell edge, in operation 1e-20. In the disclosure, examples of the predefined mathematical formulas may be as follows. The UE 1e-05 may determine the UE's mobility by using one of the following mathematical formulas.

Example of First Mathematical Formula:

$(Srxlev_{Ref} - Srxlev) < S_{SearchDeltaP}$ and $Srxlev_{Ref} > S_{SearchDeltaP} + Q_{offsetRelaxed}$ Example of Second Mathematical Formula:

$(Srxlev_{Ref} - Srxlev) < S_{SearchDeltaP}$ and $Srxlev > Q_{offsetRelaxed}$

Example of Third Mathematical Formula:

$(Srxlev_{Ref} - Srxlev) < S_{SearchDeltaP}$ and $Srxlev > Thresh_{RelaxedP}$ and $Squal > Thresh_{RelaxedQ}$ Example of Fourth Mathematical Formula:

$(Srxlev_{Ref} - Srxlev) < S_{SearchDeltaP}$ and $Q_{rxlevmeas} > Thresh_{RelaxedP}$ Example of Fifth Mathematical Formula:

$(Srxlev_{Ref} - Srxlev) < S_{SearchDeltaP}$ and $Q_{rxlevmeas} > Thresh_{RelaxedP}$ $Q_{qualmeas} > Thresh_{RelaxedQ}$ Descriptions about the above terms are as follows.

Srxlev=current Srxlev value of the serving cell (dB).

$Srxlev_{Ref}$=reference Srxlev value of the serving cell (dB), set as follows:

After selecting or reselecting a new cell, or
If (Srxlev−Srxlev$_{Ref}$)>0, or
After switching RRC_INACTIVE to RRC_IDLE, or
If the relaxed monitoring criterion has not been met for T$_{SearchDeltaP}$:
the UE shall set the value of Srxlev$_{Ref}$ to the current Srxlev value of the serving cell;

T$_{SearchDeltaP}$=X minutes, or the enhanced discontinuous reception (eDRX) cycle length if eDRX is configured and the eDRX cycle length is longer than X minutes.

Q$_{offsetRelaxed}$=offset used to derive the relaxed monitoring criterion (decibels (dB))

Thresh$_{RelaxedP}$=Minimum required RX level to indicate that UE is not in cell edge (decibemilliwatts (dBm))

Thresh$_{RelaxedQ}$=Minimum required quality level to indicate that UE is not in cell edge (dB)

Q$_{rxlevmeas}$=Measured cell RX level value (RSRP)

Values of S$_{SearchDeltaP}$ and T$_{SearchDeltaP}$ may have been predefined, or may be configured through the system information from the gNB 1e-10 or dedicated signaling.

The second and third mathematical formulas may use Srxlev or Srxlev/Squal. Srxlev or Squal Parameters which are some derived values of S-Criterion may generally represent signal quality of a serving cell. The Srxlev and Squal values may be derived without application of the predefined configuration parameters from the gNB 1e-10, and in this case, signal processing in beam level may depend on UE implementation. A cell fulfilling Srxlev>0 and Squal>0 may be a selectable cell. That is, Srxlev<=0 or Squal<=0 means that the UE 1e-05 is in an edge of a service area of the corresponding cell or out of the service area. To trigger RRM measurement relaxation, the UE 1e-05 may need to be within the service area of the corresponding cell without being around a cell edge. Accordingly, the second and third mathematical formulas may evaluate that the UE 1e-05 is within the service area of the corresponding cell without being around a cell edge, through a condition that Srxlev or Srxlev/Squal is greater than a predefined configuration value.

The fourth and fifth mathematical formulas may use Q$_{rxlevmeas}$ and Q$_{qualmeas}$ that are applied in Ranking. Q$_{rxlevmeas}$ and Q$_{qualmeas}$ parameters may be obtained by applying the predefined configuration parameters provided from the gNB 1e-10 to process signal intensities of one or more beams and derive a signal quality value of the serving cell. Accordingly, the Q$_{rxlevmeas}$ and Q$_{qualmeas}$ parameters may be used to control the influence of beams, which is one of features of the next-generation mobile communication system. Q$_{rxlevmeas}$ and Q$_{qualmeas}$ may be measured RSRP and RSRQ values of the serving cell. The gNB 1e-10 may provide the UE 1e-05 with a nrofSS-BlocksToAverage parameter and an absThreshSS-BlocksConsolidation parameter through the system information. The UE 1e-05 may average beams (SS/PBCH block) having greater signal intensities than absThreshSS-BlocksConsolidation with a linear power scale to derive Q$_{rxlevmeas}$ and Q$_{qualmeas}$. In this case, a total number of the beams used when obtaining the average value may not exceed nrofSS-BlocksToAverage, and the beams may be considered in an order from a greatest signal intensity to a smallest signal intensity for obtaining the average value. When at least one of the Q$_{rxlevmeas}$ or Q$_{qualmeas}$ parameters is not provided or all beams of the serving cell provide lower signal intensities than absThreshSS-BlocksConsolidation, the UE 1e-05 may derive Q$_{rxlevmeas}$ and Q$_{qualmeas}$ in consideration of a beam providing a greatest signal intensity.

That any one of the first to fifth mathematical formulas applied by the UE 1e-05 is fulfilled may represent that the UE 1e-05 is in a mobility state in which the relaxed RRM measurement is applicable (that is, a stop state or a low-speed state) and the UE 1E-05 is not in a cell edge. '(Srxlev$_{Ref}$−Srxlev)<S$_{SearchDeltaP}$' included in common in the first to fifth mathematical formulas may be a mathematical formula for evaluating a mobility state in which relaxed RRM measurement is applicable. Also, to evaluate a mobility state, MSE described above with reference to FIG. 1D, instead of the mathematical formula '(Srxlev$_{Ref}$−Srxlev)<S$_{SearchDeltaP}$', may be applied. In the first to fifth mathematical formulas, the remaining mathematical formulas excluding '(Srxlev$_{Ref}$−Srxlev)<S$_{SearchDeltaP}$' may be aimed to determine that the UE 1e-05 is not in a cell edge. Q$_{offsetRelaxed}$, Thresh$_{RelaxedP}$, Thresh$_{RelaxedQ}$ and T$_{SearchDeltaP}$ may be configuration values provided by the system information, and T$_{SearchDeltaP}$ may be a predefined constant value.

The UE 1e-05 may determine whether to trigger relaxed RRM measurement, in consideration of the following conditions including whether the relaxed monitoring criterion is fulfilled for a period of T$_{SearchDeltaP}$, in operation 1e-25. For example, when all of the following conditions are fulfilled, the UE 1e-05 may perform relaxed RRM measurement.

The relaxed monitoring criterion is fulfilled for a period of T$_{SearchDeltaP}$, and Less than 24 hours have passed since measurements for cell reselection were last performed, and The UE has performed intra-frequency or inter-frequency measurements for at least T$_{SearchDeltaP}$ after selecting or reselecting a new cell, and The UE has performed intra-frequency or inter-frequency measurements for at least T$_{SearchDeltaP}$ after switching RRC_INACTIVE to RRC_IDLE The UE 1e-05 may perform cell measurement for a predefined time, after the UE 1e-05 receives an RRC Release message and then is converted from RRC_INACTIVE to RRC_IDLE.

The RRC Release message may include frequency priority information. Performing general RRM measurement for a predefined time in a UE by considering new configuration information may be effective in stabilizing mobility performance.

The UE 1e-05 may perform intra-/inter-/inter-RAT frequency relaxed RRM measurement, and at this time, the UE 1e-05 may save consumption power by applying a long measurement period compared to general RRM measurement or reducing the number of cells or frequencies to be measured, in operation 1e-30.

As described above, the gNB 1e-10 may provide the UE 1e-05 with frequency priority information by using system information or dedicated signaling (RRC Release message). A reason why the gNB 1e-10 provides the UE 1e-05 with frequency priority information may be to reflect a network deployment/policy such as load balancing, etc. To reflect a network deployment/policy such as load balancing, etc., the UE 1e-05 may need to continuously measure a frequency having a priority higher than that of a serving cell on which the UE 1e-05 currently camps. Therefore, according to an embodiment of the disclosure, the UE 1e-05 may perform, even when the relaxed monitoring criterion is satisfied, general RRM measurement, instead of relaxed RRM measurement, on a frequency having a priority higher than the serving cell on which the UE 1e-05 currently camps. Accordingly, when the UE 1e-05 receives frequency priority information through system information or a dedicated signaling message, and a frequency having a priority higher than that of the serving cell on which the UE 1e-05 currently camps exists among frequencies for which priority information has been configured, the UE 1e-05 may need to perform general RRM measurement on the corresponding frequency regardless of whether the relaxed monitoring criterion is fulfilled.

Alternatively, whether to perform general RRM measurement on a priority frequency may be selectively configured by system information or dedicated signaling.

Figure 1F:
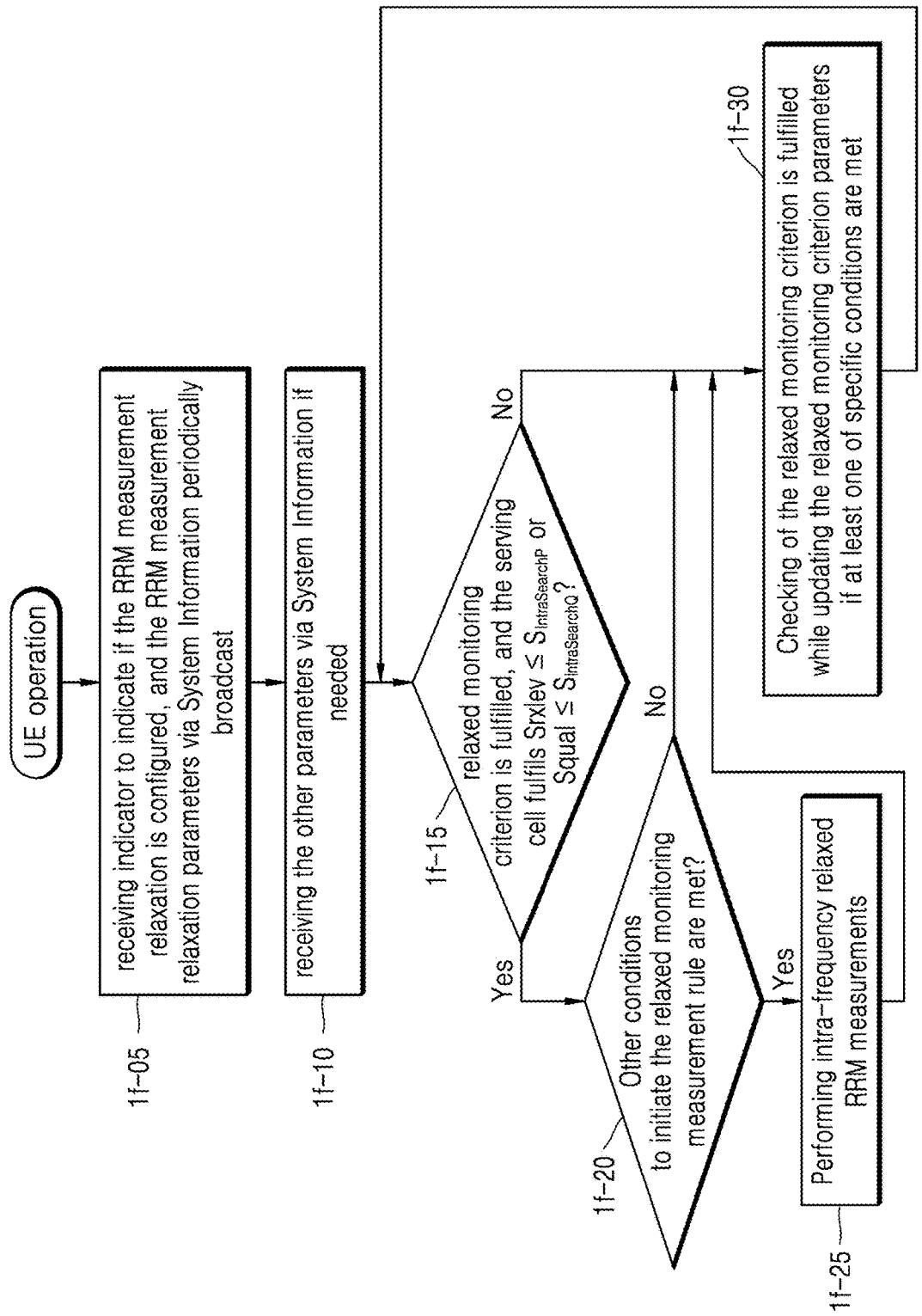
FIG. 1F illustrates a flowchart showing a UE operation of determining intra-frequency relaxed RRM measurement, according to a first embodiment of the disclosure.

FIG. 1F illustrates a flowchart showing a UE operation of determining intra-frequency relaxed RRM measurement according to a first embodiment of the disclosure.

Referring to FIG. 1F, in operation 1f-05, a UE may receive an indicator indicating whether a serving gNB supports RRM measurement relaxation, through system information (that is, SIB1) that is broadcasted periodically. Alternatively, configuration parameters related to a relaxed monitoring criterion that is used to evaluate a UE mobility state and a UE location may be included in SIB1 and transferred to the UE. In this case, the configuration parameters related to the relaxed monitoring criterion may function as an indicator indicating whether a serving gNB supports RRM measurement relaxation, and therefore, there may be no indicator indicating whether a serving gNB supports RRM measurement relaxation.

When the UE identifies that the UE supports relaxed RRM measurement and the serving gNB also supports relaxed RRM measurement based on the received system information, the UE may receive another SIB including configuration parameters required for performing relaxed RRM measurement, in operation 1f-10. The configuration parameters may mean configuration parameters related to relaxed RRM measurement, for example, at least one of $Q_{offsetRelaxed}$, $Thresh_{RelaxedP}$, $Thresh_{RelaxedQ}$ or $T_{SearchDeltaP}$ as described above.

In operation 1f-15, the UE may determine whether the relaxed monitoring criterion is fulfilled and $Srxlev<=S_{IntraSearchP}$ or $Squal<=S_{IntraSearchQ}$ is fulfilled.

When the relaxed monitoring criterion is fulfilled and $Srxlev<=S_{IntraSearchP}$ or $Squal<=S_{IntraSearchQ}$ is fulfilled, the UE may determine whether other conditions for triggering the relaxed RRM measurement are fulfilled, in operation 1f-20.

When all the other conditions are fulfilled, the UE may perform relaxed monitoring measurement, in operation 1f-25.

In operation 1f-30, the UE may determine whether the relaxed monitoring criterion is fulfilled continuously for a period of $T_{SearchDeltaP}$, and in some cases, the UE may update parameters that are applied to the relaxed monitoring criterion. Particularly, $Srxlev_{Ref}$ may be updated whenever at least one of predefined conditions is fulfilled. The predefined conditions under which $Srxlev_{Ref}$ is updated may be, for example, as follows.

Figure 1G:
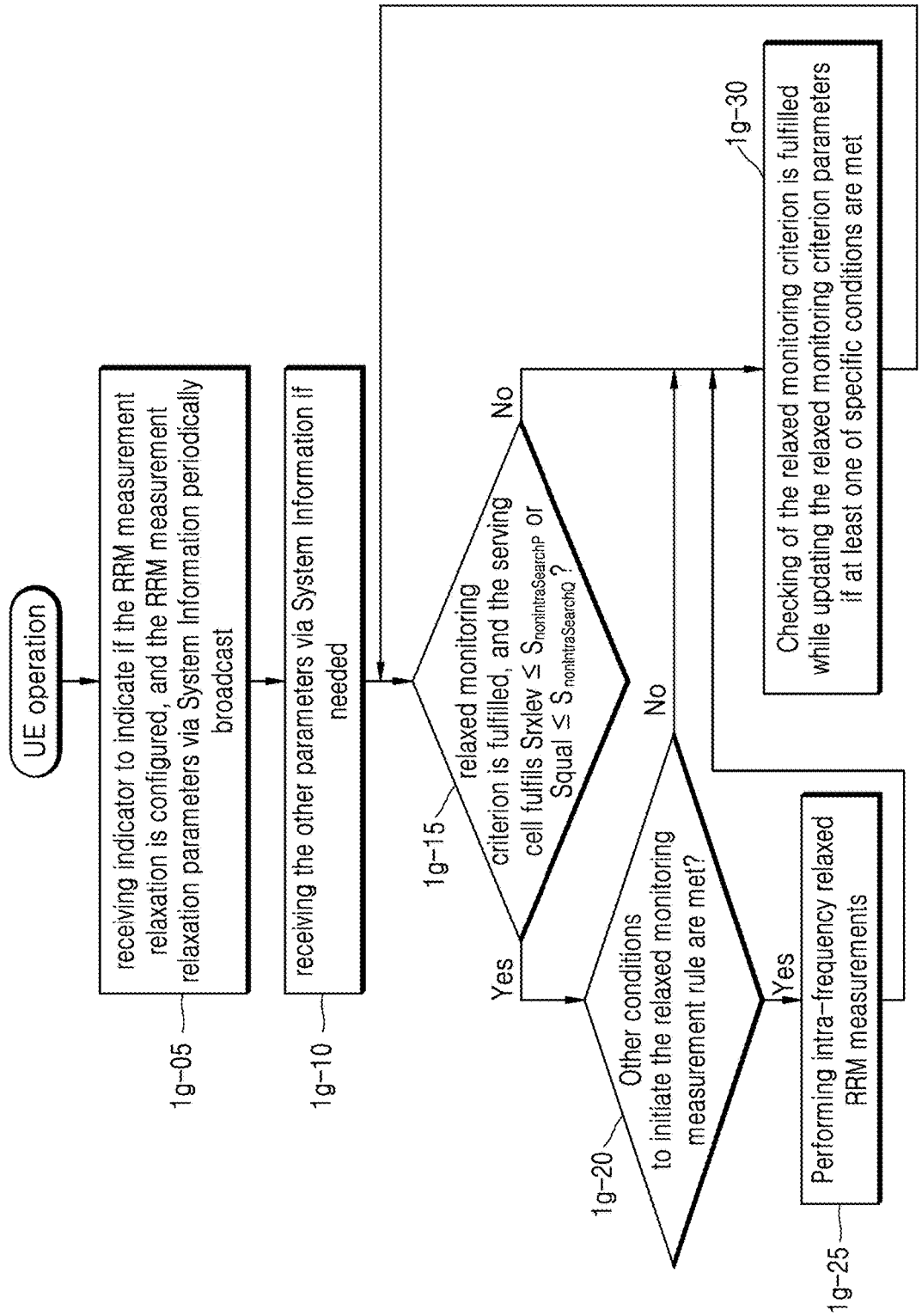
FIG. 1G illustrates a flowchart showing a UE operation of determining inter-frequency/inter-radio access technology (RAT) frequency relaxed RRM measurement, according to a second embodiment of the disclosure.

After selecting or reselecting a new cell, or
If (Srxlev−$Srxlev_{Ref}$)>0, or
After switching RRC_INACTIVE to RRC_IDLE, or
If the relaxed monitoring criterion has not been met for $T_{SearchDeltaP}$, the UE shall set the value of $Srxlev_{Ref}$ to the current Srxlev value of the serving cell FIG. 1G illustrates a flowchart showing a UE operation of determining inter-frequency/inter-RAT frequency relaxed RRM measurement according to a second embodiment of the disclosure.

Referring to FIG. 1G, in operation 1g-05, the UE may receive an indicator indicating whether a serving gNB supports RRM measurement relaxation, through system information (SIB1) that is broadcasted periodically. Also, configuration parameters related to a relaxed monitoring criterion that is used to evaluate a UE mobility state and a UE location may be included in SIB1 and transferred to the UE. In this case, the configuration parameters related to the relaxed monitoring criterion may function as an indicator indicating whether a serving gNB supports RRM measurement relaxation, and therefore, there may be no indicator indicating whether a serving gNB supports RRM measurement relaxation.

When the UE identifies that the UE supports relaxed RRM measurement and the serving gNB also supports relaxed RRM measurement based on the received system information, the UE may receive another SIB including configuration parameters required for performing relaxed RRM measurement, in operation 1f-10. The configuration parameters may mean configuration parameters related to relaxed RRM measurement, for example, at least one of $Q_{offsetRelaxed}$, $Thresh_{RelaxedP}$, $Thresh_{RelaxedQ}$ or $T_{SearchDeltaP}$ as described above.

In operation 1g-15, the UE may determine whether a relaxed monitoring condition is fulfilled and $Srxlev<=S_{nonIntraSearchP}$ or $Squal<=S_{nonIntraSearchQ}$ is fulfilled.

When the UE determines that the relaxed monitoring condition is fulfilled and $Srxlev<=S_{nonIntraSearchP}$ or $Squal<=S_{nonIntraSearchQ}$ is fulfilled, the UE may determine whether other conditions for triggering relaxed RRM measurement are fulfilled, in operation 1g-20.

When all the other conditions are fulfilled, the UE may perform relaxed RRM measurement, in operation 1g-25.

In operation 1g-30, the UE may determine whether the relaxed monitoring criterion is fulfilled continuously for a period of $T_{SearchDeltaP}$, and in some cases, the UE may update parameters that are applied to the relaxed monitoring criterion. Particularly, $Srxlev_{Ref}$ may be updated whenever at least one of predefined conditions is fulfilled. The predefined conditions under which $Srxlev_{Ref}$ is updated may be, for example, as follows.

After selecting or reselecting a new cell, or
If (Srxlev−$Srxlev_{Ref}$)>0, or
After switching RRC_INACTIVE to RRC_IDLE, or
If the relaxed monitoring criterion has not been met for $T_{SearchDeltaP}$, the UE shall set the value of $Srxlev_{Ref}$ to the current Srxlev value of the serving cell FIG. 1H illustrates a flowchart showing a UE operation of determining inter-frequency/inter-RAT frequency relaxed RRM measurement at a high-priority frequency according to an embodiment of the disclosure.

In operation 1h-05, a UE being in an IDLE mode or an inactive mode may receive system information from a serving gNB. The system information may be configured with one or more SIBs, and the SIBs may include different configuration parameters. The SIBs may be provided to the UE according to different pieces of scheduling information. For example, SIB1 may be broadcasted periodically from a predefined radio resource, and may include scheduling information of other SIBs. SIB2 may include a cell reselection configuration parameter required in common for intra-frequency, inter-frequency and/or inter-RAT frequency cell reselection operation. SIB3 may include a cell reselection configuration parameter required for intra-frequency cell reselection operation. SIB4 may include a cell reselection configuration parameter required for inter-frequency cell reselection operation. SIB5 may include a cell reselection configuration parameter required for inter-RAT frequency cell reselection operation. According to gNB implementation, each of SIB2, SIB3, SIB4 and SIB5 may be broadcasted for a predefined time according to a request from a UE, or may be broadcasted periodically, like SIB1.

SIB2 may include the above-mentioned configuration parameters for RRM measurement relaxation according to the disclosure.

An indicator indicating whether to perform relaxed RRM measurement on a frequency having a priority higher than that of a serving frequency to which a serving cell belongs may be provided to the UE through system information. In the disclosure, as methods for including an indicator indicating whether to perform relaxed RRM measurement in system information, the following methods are proposed.

According to a first method, a 1-bit indicator indicating whether to apply relaxed RRM measurement to all frequencies having priorities higher than that of a serving frequency to which a serving cell belongs may be included in SIB1 or SIB2. Therefore, when the UE is configured, through the 1-bit indicator, that the relaxed RRM measurement is not applied, the UE may perform general RRM measurement on all frequencies having high priorities, instead of performing the relaxed RRM measurement, although the above-described conditions for applying the relaxed RRM measurement are fulfilled.

According to a second method, a 1-bit indicator indicating whether to apply relaxed RRM measurement on an inter-frequency having a priority higher than that of a serving frequency to which a serving cell belongs may be included in SIB4. Also, a 1-bit indicator indicating whether to apply relaxed RRM measurement on an inter-RAT frequency having a priority higher than that of a serving frequency to which a serving cell belongs may be included in SIB5. Accordingly, in the second method, whether to apply relaxed RRM measurement may be indicated separately for inter-frequency or inter-RAT frequency.

According to a third method, indicators indicating whether to apply relaxed RRM measurement to a frequency having a priority higher than that of a serving frequency to which a serving cell belongs for each inter frequency and each inter-RAT frequency may be included in SIB4 and SIB5, respectively. Accordingly, whether to apply relaxed RRM measurement may be indicated for each higher priority frequency.

SIB4 may include InterFreqCarrierFreqInfo IE including cell reselection parameters for each inter frequency. The InterFreqCarrierFreqInfo IE may include a new 1-bit indicator for each frequency described above in the second method or the third method, and the new 1-bit indicator may be used to indicate whether to apply relaxed RRM measurement for each frequency.

SIB5 may include CarrierFreqEUTRA IE including cell reselection parameters for each inter-RAT frequency. The CarrierFreqEUTRA IE may include a new 1-bit indicator for each frequency described above in the second method or the third method, and the new 1-bit indicator may be used to indicate whether to apply relaxed RRM measurement for each frequency. In a NR standard, for an inter-RAT system, EUTRA (LTE) may be considered. However, when other systems than EUTRA (LTE) are additionally considered in future in the NR standard, the method according to the disclosure may be extended/inferred and applied to the additionally considered other systems.

Also, according to an embodiment of the disclosure, instead of a method of adding a predefined indicator to IE corresponding to each frequency, indicators for individual frequencies may be configured in a list form and provided to a UE. When indicators for individual frequencies are configured in a list form and provided to a UE, the list may be configured with predefined indicators described above in the second method or the third method. An order of the indicators included in the list may be identical to an order in which IEs corresponding to the individual frequencies are included in SIB4 and SIB5.

According to an embodiment of the disclosure, providing the UE with a 1-bit indicator indicating whether to apply the relaxed RRM measurement may be to indicate the UE not to apply relaxed RRM measurement to a frequency corresponding to the indicator, and not providing the UE with the 1-bit indicator may be to indicate the UE to apply relaxed RRM measurement to the corresponding frequency, and vice versa.

Alternatively, a gNB may explicitly indicate information about whether a 1-bit indicator indicating whether to apply the relaxed RRM measurement indicates application of relaxed RRM measurement or non-application of relaxed RRM measurement to the UE (for example, explicitly indicating information may be included in system information or transferred through RRC signaling).

In operation 1*h*-10, the UE may use the relaxed monitoring criterion described above to determine UE mobility and a UE location.

In operation 1*h*-15, the UE may recognize (or identify) that a condition for triggering relaxed RRM measurement is fulfilled.

In operation 1*h*-20, the UE may determine whether performing relaxed RRM measurement on a high-priority frequency is configured, by using system information.

When performing relaxed RRM measurement on a high-priority frequency is configured, the UE may perform relaxed RRM measurement on all frequencies, in operation 1*h*-25. At this time, the UE may not perform relaxed RRM measurement on the serving cell.

When performing relaxed RRM measurement on a high-priority frequency is not configured, the UE may perform relaxed RRM measurement on other frequencies excluding the high-priority frequency, in operation 1*h*-30.

In operation 1*h*-35, when at least one event of the following events occurs, the UE may stop the relaxed RRM measurement being performed.

When System Information broadcasts parameters related to RRM measurement relaxation no longer,
When the relaxed monitoring criterion is fulfilled no longer,
upon cell selection or reselection,
when less than 24 hours have passed since measurements for cell reselection were last performed, or
entering Any Cell Selection or Camped on Any Cell state, stopping the relaxed RRM measurements In this case, the UE may have stored configuration parameters related to the relaxed RRM measurement.

Figure 1I:
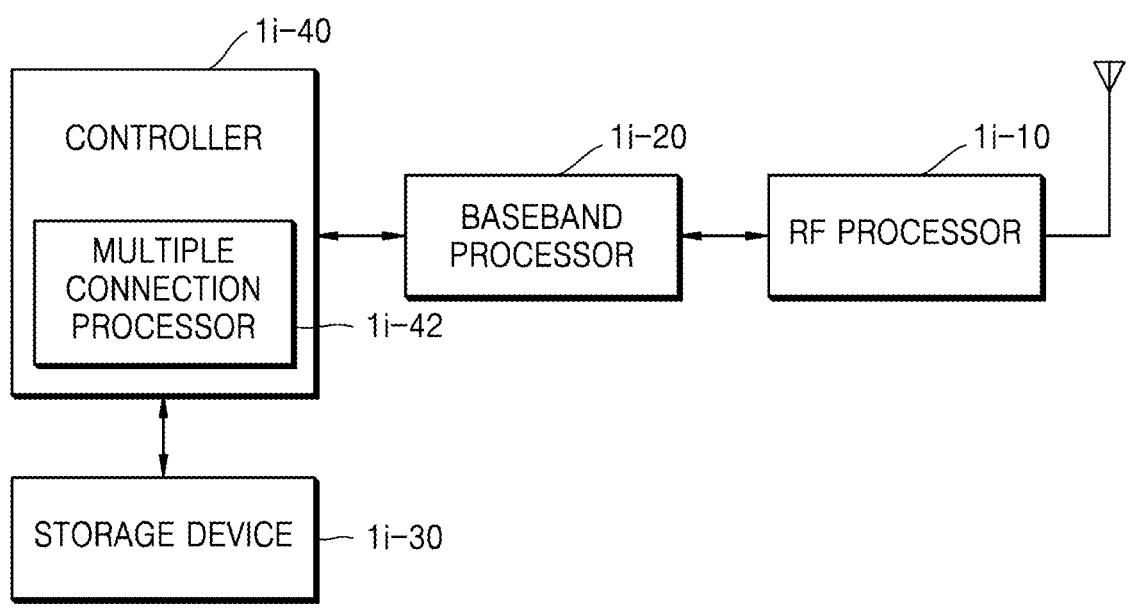
FIG. 1I illustrates a block diagram showing an internal structure of a UE according to an embodiment of the disclosure.

FIG. 1I illustrates a block diagram showing an internal structure of a UE according to an embodiment of the disclosure.

Referring to FIG. 1I, the UE may include a Radio Frequency (RF) processor 1*i*-10, a baseband processor 1*i*-20, a storage device 1*i*-30, and a controller 1*i*-40. However, the internal structure of the UE is not limited to components shown in FIG. 1I, and may be implemented with more components than the components shown in FIG. 1I.

The RF processor 1*i*-10 may perform functions for transmitting and receiving signals through a wireless channel, such as signal band conversion, signal amplification, etc. That is, the RF processor 1*i*-10 may up-convert a baseband signal provided from the baseband processor 1i-20 into an RF band signal and then transmit the RF band signal through an antenna. Also, the RF processor 1i-10 may down-convert a RF band signal received through the antenna into a baseband signal. For example, the RF processor 1i-10 may include a transmission filter, a reception filter, an amplifier, a mixer, an oscillator, a digital to analog convertor (DAC), an analog to digital convertor (ADC), etc. In FIG. 1I, a single antenna is shown, however, the UE may include a plurality of antennas. Also, the RF processor 1i-10 may include a plurality of RF chains.

Furthermore, the RF processor 1i-10 may perform beamforming. For beamforming, the RF processor 1i-10 may adjust phases and magnitudes of signals that are transmitted and received through the plurality of antennas or antenna elements. Also, the RF processor 1i-10 may perform Multi Input Multi Output (MIMO), and when a MIMO operation is performed, the RF processor 1i-10 may receive several layers.

The baseband processor 1i-20 may perform a function for conversion between baseband signals and bit streams according to a physical layer standard of a system. For example, upon data transmission, the baseband processor 1i-20 may encipher and modulate a transmission bit stream to generate complex symbols. Also, upon data reception, the baseband processor 1i-20 may demodulate and decipher a baseband signal provided from the RF processor 1i-10 to restore a reception bit stream. For example, according to an OFDM method, upon data transmission, the baseband processor 1i-20 may encipher and modulate a transmission bit stream to generate complex symbols, map the complex symbols to subcarriers, and then construct OFDM symbols through inverse fast Fourier transform (IFFT) and cyclic prefix (CP) insertion. Also, upon data reception, the baseband processor 1i-20 may segment a baseband signal provided from the RF processor 1i-10 in units of OFDM symbols, restore signals mapped to subcarriers through fast Fourier transform (FFT), and then restore a reception bit stream through demodulation and deciphering.

The baseband processor 1i-20 and the RF processor 1i-10 may transmit and receive signals as described above. Accordingly, the baseband processor 1i-20 and the RF processor 1i-10 are also referred to as a transmitter, a receiver, a transceiver, or a communicator. Furthermore, at least one of the baseband processor 1i-20 or the RF processor 1i-10 may include a plurality of communication modules to support a plurality of different air interface technologies. Also, at least one of the baseband processor 1i-20 or the RF processor 1i-10 may include different communication modules to process signals of different frequency bands. For example, the different air interface technologies may include a wireless LAN (for example, IEEE 802.11), a cellular network (for example, LTE), etc. Also, the different frequency bands may include a super high frequency (SHF) (e.g., from 3 giga-Hertz (GHz) to 30 GHz) band and a millimeter wave (e.g., 60 GHz) band. The UE may transmit/receive a signal to/from a gNB by using the baseband processor 1i-20 and the RF processor 1i-10, wherein the signal may include control information and data.

The storage device 1i-30 may store data, such as basic programs, application programs, and configuration information, for operations of the UE. The storage device 1i-30 may store information related to a second connection node that performs wireless communication by using a second air interface technology. The storage device 1i-30 may provide the stored data according to a request from the controller 1i-40. The storage device 1i-30 may be configured with a storage medium, such as read only memory (ROM), random access memory (RAM), a hard disc, compact disc ROM (CD-ROM), digital versatile disc (DVD), and the like, or a combination of such a storage media. Also, the storage device 1i-30 may be configured with a plurality of memories.

The controller 1i-40 may control overall operations of the UE. For example, the controller 1i-40 may transmit and receive signals through the baseband processor 1i-20 and the RF processor 1i-10. Also, the controller 1i-40 may write data in the storage device 1i-30 or read data from the storage device 1i-30. To write or read data, the controller 1i-40 may include at least one processor. Also, the controller 1i-40 may further include a multiple connection processor 1i-42 for supporting multiple connections. For example, the controller 1i-40 may include a communication processor CP for performing control for communication, and an application processor AP for controlling an upper layer of an application program, etc. Also, the controller 1i-40 may control the UE to perform the method for performing relaxed RRM measurement as described above. Also, at least one component of the UE may be implemented as a single chip.

Figure 1J:
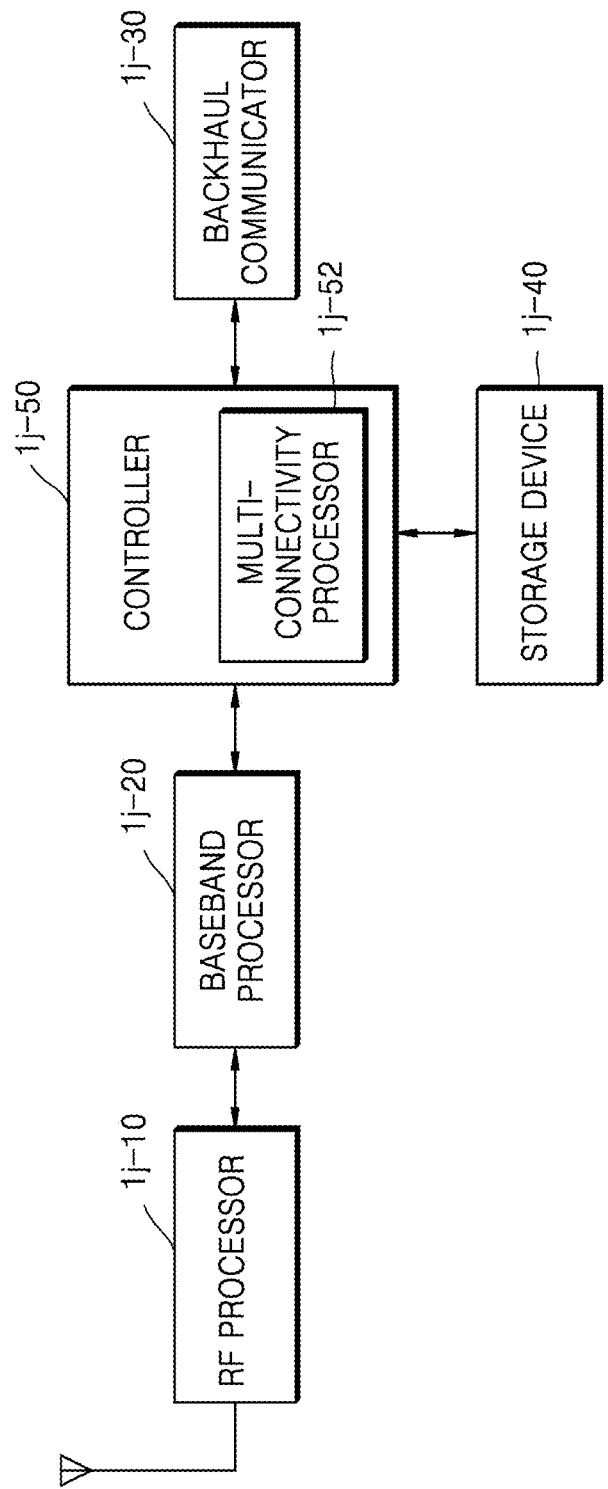
FIG. 1J illustrates a block diagram showing a configuration of a next-generation Node B (gNB) according to an embodiment of the disclosure.

FIG. 1J illustrates a block diagram showing a configuration of a gNB according to an embodiment of the disclosure.

Referring to FIG. 1J, the gNB may include a RF processor 1j-10, a baseband processor 1j-20, a backhaul communicator 1j-30, a storage device 1j-40, and a controller 1j-50. However, a configuration of the gNB is not limited to the embodiment shown in FIG. 1J, and the gNB may include more or less components than those shown in FIG. 1J.

The RF processor 1j-10 may perform a function for transmitting and receiving signals through a wireless channel, such as band conversion, amplification, etc. of signals. That is, the RF processor 1j-10 may up-convert a baseband signal provided from the baseband processor 1j-20 into a RF band signal, transmit the RF band signal through an antenna, and down-convert an RF band signal received through the antenna into a baseband signal. For example, the RF processor 1j-10 may include a transmission filter, a reception filter, an amplifier, a mixer, an oscillator, a DAC, an ADC, etc. In FIG. 1J, a single antenna is shown, however, the gNB may include a plurality of antennas. Also, the RF processor 1j-10 may include a plurality of RF chains.

Furthermore, the RF processor 1j-10 may perform beamforming. For beamforming, the RF processor 1j-10 may adjust phases and magnitudes of signals that are transmitted/received through the plurality of antennas or antenna elements. The RF processor 1j-10 may perform a downlink MIMO operation by transmitting one or more layers.

The baseband processor 1j-20 may perform a function of conversion between baseband signals and bit streams according to a physical layer specification of a first air interface technology. For example, upon data transmission, the baseband processor 1j-20 may encipher and modulate a transmission bit stream to generate complex symbols. Also, upon data reception, the baseband processor 1j-20 may demodulate and decipher a baseband signal provided from the RF processor 1j-10 to restore a reception bit stream. For example, according to the OFDM method, upon data transmission, the baseband processor 1j-20 may encipher and modulate a transmission bit stream to generate complex symbols, map the complex symbols to subcarriers, and then construct OFDM symbols through IFFT and CP insertion. Also, upon data reception, the baseband processor 1j-20 may segment a baseband signal provided from the RF processor 1j-10 in units of OFDM symbols, restore signals mapped to subcarriers through FFT, and then restore a reception bit stream through demodulation and deciphering. The baseband processor 1j-20 and the RF processor 1j-10 may transmit and receive signals as described above. Accordingly, the baseband processor 1j-20 and the RF processor 1j-10 are also referred to as a transmitter, a receiver, a transceiver, a communicator, or a wireless communicator. The gNB may transmit/receive a signal to/from the UE by using the baseband processor 1j-20 and the RF processor 1j-10, wherein the signal may include control information and data.

The backhaul communicator 1j-30 may provide an interface for communicating with other nodes in a network. That is, the backhaul communicator 1j-30 may convert a bit stream that is transmitted from the gNB to another node (for example, a secondary base station, a core network, etc.) into a physical signal, and convert a physical signal received from another node into a bit stream.

The storage device 1j-40 may store data, such as basic programs, application programs, and configuration information, for operations of the gNB. Particularly, the storage device 1j-40 may store information about a bearer assigned to a UE connected to the gNB, a measurement result reported from the connected UE, etc. Also, the storage device 1j-40 may store information that is used as a determination criterion about whether to provide multiple connections to the UE or whether to release multiple connections to the UE. Also, the storage device 1j-40 may provide the stored data according to a request from the controller 1j-50. The storage device 1j-40 may be configured with a storage medium, such as ROM, RAM, a hard disc, CD-ROM, DVD, and the like, or a combination of such a storage media. Also, the storage device 1j-40 may be configured with a plurality of memories.

The controller 1j-50 may control overall operations of the gNB. For example, the controller 1j-50 may transmit and receive signals through the baseband processor 1j-20 and the RF processor 1j-10 or through the backhaul communicator 1j-30. Also, the controller 1j-50 may write data in the storage device 1j-40 or read data from the storage device 1j-40. To write or read data, the controller 1j-50 may include at least one processor. Also, the controller 1j-50 may further include a multiple connection processor 1j-52 for supporting multiple connections. Also, the controller 1j-50 may control the gNB such that the UE may perform the method for performing relaxed RRM measurement as described above. Also, at least one component of the gNB may be implemented as a single chip.

The method and apparatus for saving power of a user equipment (UE) upon measurement by proposing a stepwise measurement operation of the UE will be described below. Particularly, the disclosure provides a method and apparatus for efficiently reducing power consumption of a UE by proposing a criterion for relaxed measurement for each parameter provided for radio resource management (RRM) measurement for each of intra-frequencies measurement and inter-frequencies measurement.

Figure 2A:
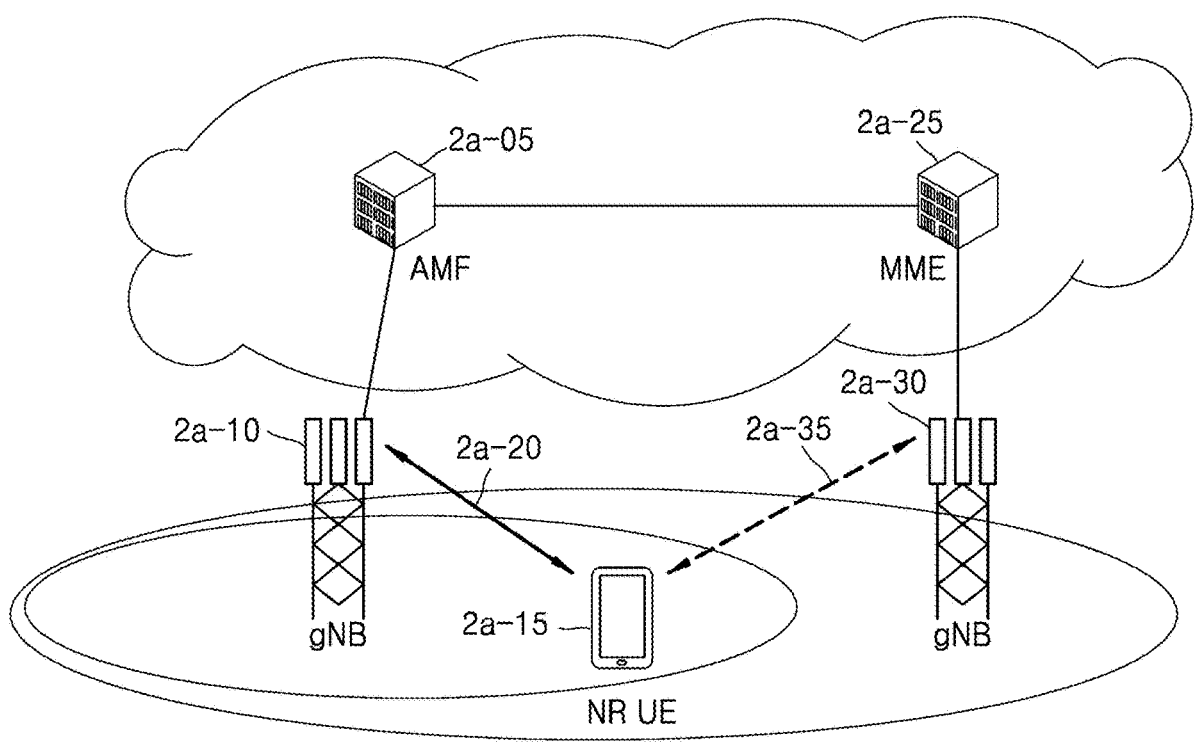
FIG. 2A shows a structure of a next-generation mobile communication system.

FIG. 2A shows a structure of a next-generation mobile communication system.

Referring to FIG. 2A, a radio access network of a next-generation mobile communication system (New Radio (NR)) may be configured with a New Radio Node B (NR gNB) (hereinafter, referred to as a gNB) 2a-10 and an Access and Mobility Management Function (AMF) 2a-05 which is an entity in a New Radio Core Network (NR CN). A New Radio User Equipment (hereinafter, referred to as a NR UE or UE) 2a-15 may be connected to an external network through the gNB 2a-10 and the AMF 2a-05.

In FIG. 2A, the gNB 2a-10 may correspond to an Evolved Node B (eNB) of an existing LTE system. The gNB 2a-10 may be connected to the NR UE 2a-15 through a wireless channel 2a-20, and provide a more excellent service than an existing node B. In the next-generation mobile communication system, because all user traffics are serviced through a shared channel, a device for performing scheduling by collecting status information of UEs, such as buffer statuses of UEs, available transmission power states of UEs, channel states of UEs, etc., is needed. The gNB 2a-10 may function as such a device. A NR gNB may generally control a plurality of cells. To implement ultra-high-speed data transmission compared to existing LTE systems, the next-generation mobile communication system may use an existing maximum bandwidth or more, and use Orthogonal Frequency Division Multiplexing (OFDM) as air interface technology to additionally combine the OFDM with beamforming technology. Also, the next-generation mobile communication system may employ Adaptive Modulation & Coding (hereinafter, referred to as AMC) of determining a modulation scheme and a channel coding rate according to a channel state of a UE. The AMF 2a-05 may perform functions, such as mobility support, bearer configuration, Quality of Service (QoS) configuration, etc. The AMF 2a-05 may be in charge of various control functions, as well as a mobility management function for UEs, and may be connected to a plurality of gNBs. Also, the next-generation mobile communication system may interwork with existing LTE systems, and the AMF 2a-05 may be connected to a Mobility Management Entity (MME) 2a-25 through a network interface. The MME 2a-25 may be connected to an eNB 2a-30 which is a legacy BS. A UE supporting LTE-NR Dual Connectivity may be connected to the eNB 2a-30, as well as the gNB 2a-10, to transmit and receive data (2a-35).

Figure 2B:
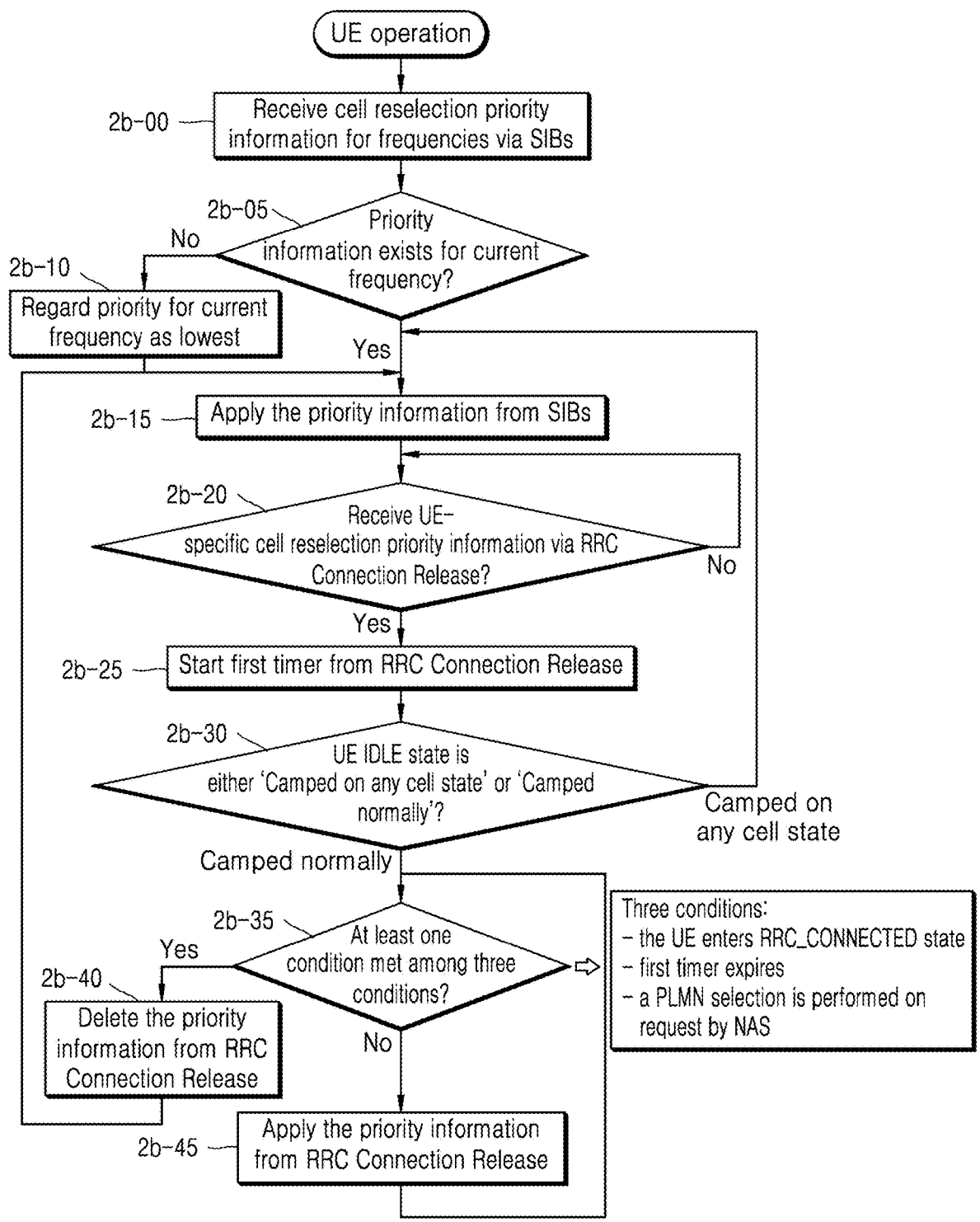
FIG. 2B illustrates a view for describing processes that cell reselection priority information for frequencies is broadcasted through at least one system information block (SIB) or the cell reselection priority information for frequencies Is transmitted to a user equipment (UE) through a radio resource control (RRC) connection release message which is dedicated RRC signaling, according to an embodiment of the disclosure.

FIG. 2B illustrates a diagram for describing processes that, in LTE, cell reselection priority information for frequencies is broadcast through at least one system information block (SIB) or the cell reselection priority information for frequencies is applied to a specific UE through a radio resource control (RRC) connection release message which is dedicated RRC signaling. Cell reselection is a process of reselecting a serving cell such that a moving UE is connected to a cell being in a most stable channel state. A network may assign priorities to frequencies to control cell reselection of UEs being in an idle mode. For example, when a UE receives priority information for two frequencies f1 and f2 and the frequency f1 has a higher priority than the frequency f2, there is high probability that the UE will stay at the frequency f1. Also, when a channel state of the frequency f2 is poor although the UE is at the frequency f2, the UE may attempt to switch to the frequency f1. Priority information for frequencies may be broadcasted through at least one SIB or provided to a specific UE through an RRC Connection Release message which is dedicated RRC signaling. When a UE already received priority information for frequencies through at least one SIB receives UE-specific priority information through RRC signaling, the UE may ignore the priority information of the at least one SIB. Priority information of each frequency may be transferred through cellReselectionPriority IE of the following Table 1 (CellReselectionPriority information element), and each frequency may be assigned one of a total of X+1 levels of priorities. A smaller value means a lower priority. That is, '0' means a lowest priority.

TABLE 1

```
-- ASN1START
-- TAG-CELLRESELECTIONPRIORITY-START
CellReselectionPriority ::=        INTEGER (0..7)
-- TAG-CELLRESELECTIONPRIORITY-STOP
-- ASN1STOP
```

Radio Access Technology (RAT) frequencies may be not capable of being assigned the same priority. Equal priorities between RATs may be not supported. When an idle state of a UE is in a 'camped on any cell state', the UE may apply frequency priority information received through at least one SIB, and store priority information received through RRC signaling without using the priority information received through the RRC signaling. The CellReselectionPriority IE, which is an optional IE, may be not included in RRC signaling. In this case, no priority information for the corresponding frequency may have been assigned. In this case, the UE may regard a priority of the corresponding frequency, as a lowest level. The UE may receive priority information for frequencies used in another RAT, as well as in Evolved Universal Terrestrial Radio Access (EUTRA), through at least one SIB, in operation 2b-00. However, priority information for all frequencies may be not necessarily provided, and priority information for a frequency of a serving cell currently camped on the UE may also be not provided. The UE may identify whether priority information is provided, in operation 2b-05. When no priority information for the frequency of the current serving cell is provided, the UE may regard a priority of the frequency as a lowest level. The UE may apply the priority information for frequencies, in operation 2b-15. When the UE receives an RRC Connection Release message from a gNB, the UE may switch a connection mode into an idle mode. The RRC Connection Release message may include frequency priority information. The frequency priority information may be UE-specific information, and may be applied, generally, more preferentially than frequency priority information received from at least one SIB. Accordingly, the UE may identify whether the RRC Connection Release message includes frequency priority information, in operation 2b-20. When the RRC Connection Release message includes frequency priority information, the UE may apply a first timer value included in the RRC Connection Release message to run a first timer, in operation 2b-25. The UE may determine or identify whether a state of a current idle mode is a 'camped on any cell state' or a 'camped normally state', in operation 2b-35. The 'camped normally state' may indicate a state in which the UE camps on a 'suitable cell'. The 'suitable cell' may be a cell capable of providing normal services to the UE, and the 'suitable cell' may be a cell fulfilling detailed conditions as follows.

Cell corresponding to a selected Public Land Mobile Network (PLMN), a registered PLMN, or a PLMN in an equivalent PLMN list Cell not barred Cell fulfilling a cell selection criterion The 'camped on any cell state' may indicate a state in which the UE camps on an 'acceptable cell' because the UE fails to camp on a 'suitable cell'. On the 'acceptable cell', normal services may be disallowed, although the UE is capable of making an emergency call. The 'acceptable cell' may be a cell fulfilling conditions as follows.

Cell not barred

Cell fulfilling a cell selection criterion

When the UE is in the idle state 'camped on any cell state', the UE may return to operation 2b-15 to apply the frequency priority information received via the at least one SIB, instead of applying the priority information received from the RRC Connection Release message. When the UE is in the idle state 'camped normally', the UE may determine whether at least one condition of three conditions below is fulfilled, in operation 2b-35. The three conditions may be as follows.

The UE enters the connection mode

The first timer is expired

A PLMN selection process is performed according to a non-access stratum (NAS) request When any one condition of the three conditions is fulfilled, the UE may delete the priority information received from the RRC Connection Release message, in operation 2b-40, and return to operation 2b-15 to apply the frequency priority information received from the at least one SIB. Otherwise, when none condition is fulfilled, the UE may apply the priority information received from the RRC Connection Release message, in operation 2b-45.

The frequency priority information may influence the UE's measurement on a specific frequency. The UE may measure all frequencies having higher priorities than that of the current serving cell. However, the UE may not always measure an intra-frequency of the serving cell, or frequencies having the same priority as the serving cell or lower priorities than the serving cell, to save UE power. In regard of whether to perform measurement, the UE may determine to perform measurement when channel QoS of the serving cell is smaller than or equal to a predefined threshold value. Cell reselection may be performed for the UE to move to a cell being in a good channel state. When the channel QoS of the current serving cell is good, there is no reason that the UE will move to a frequency having the same priority or a lower priority. Accordingly, to reduce power consumption that is caused by unnecessary channel measurement, the UE may determine whether to perform measurement based on the predefined threshold value. In the case of an intra-frequency, when QoS (that is, Srxlev or Squal) of the serving cell is equal to or lower than the predefined threshold value Sintrasearch (s-IntraSearchP and s-IntraSearchQ), the UE may perform channel measurement on other cells having the intra-frequency. The s-IntraSearchP may be a reference signals received power (RSRP)-based threshold value, and the s-IntraSearchQ may be a reference signal received quality (RSRQ)-based threshold value. When both measured RSRP and RSRQ of the serving cell are greater than the predefined threshold value, the UE may not perform intra-frequencies measurement. In regard of another inter-frequency having the same or lower priority, when the QoS (that is, Srxlev or Squal) of the serving cell is equal to or lower than a predefined threshold value Snonintrasearch (s-NonIntraSearchP and s-NonIntraSearchQ), the UE may perform channel measurement on cells of the corresponding inter-frequency. The s-NonIntraSearchP may be a RSRP-based threshold value, and the s-NonIntraSearchQ may be a RSRQ-based threshold value. When both the measured RSRP and RSRQ of the serving cell are greater than the predefined threshold value, the UE may not perform inter-frequencies measurement. In the disclosure, a state in which the UE performs channel measurement on an intra-frequency or an inter-frequency through comparison to the threshold values may be defined as a 'normal measurement state', and the other state may be defined as a 'no measurement state'. However, the UE may always measure a serving cell regardless of the measurement states.

When the UE identifies that channel QoS of a cell of a high-priority frequency is higher than a predefined threshold value ThreshX-high, while performing measurement, the UE may reselect the cell of the high-priority frequency as a serving cell. When the UE identifies that channel QoS of a cell of a low-priority frequency is higher than a predefined threshold value ThreshX-low and the QoS of the serving cell is lower than ThresholdServing-low, the UE may reselect the cell of the low-priority frequency as a serving cell.

Figure 2C:
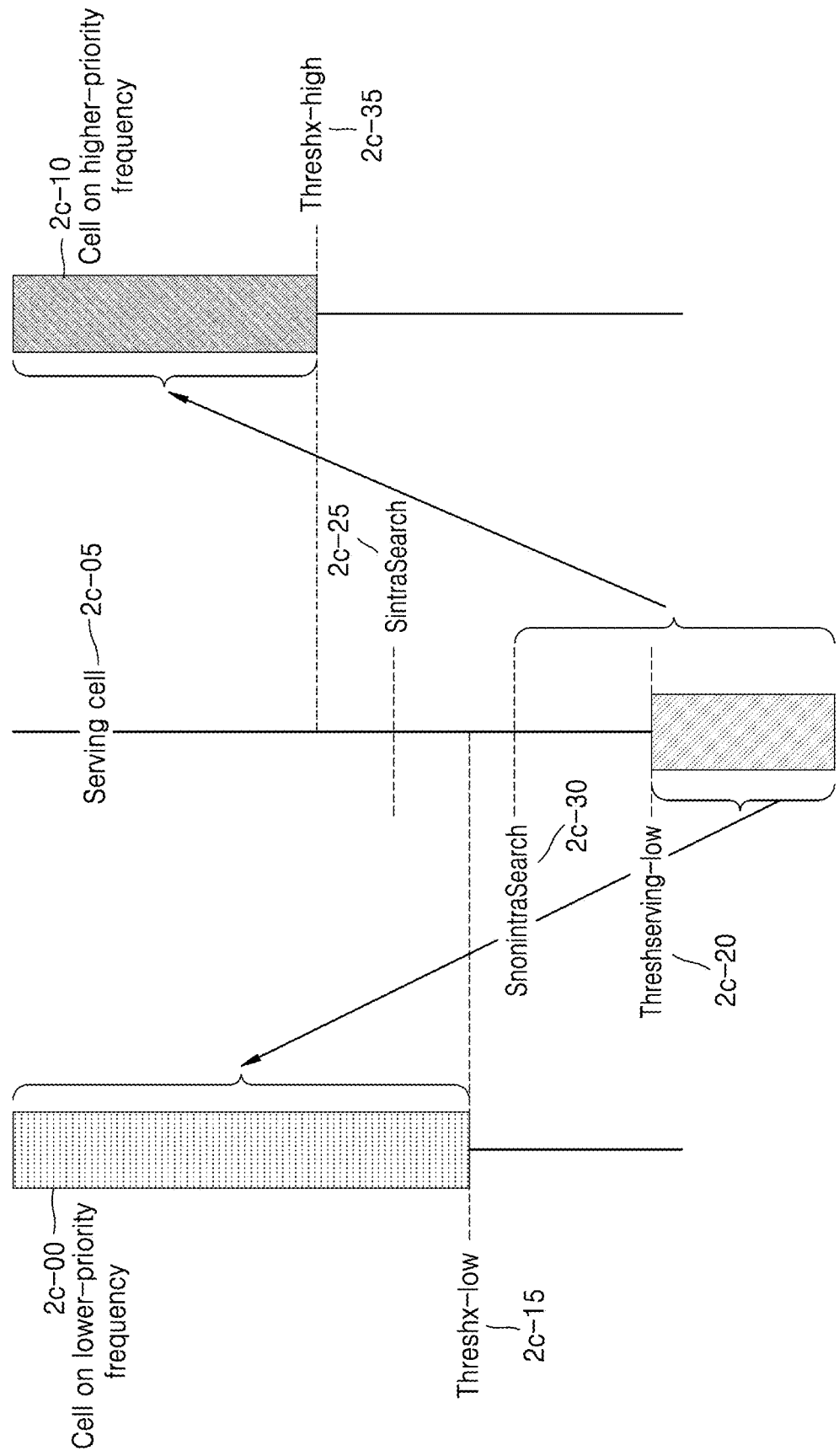
FIG. 2C illustrates a view for describing a method of performing cell reselection in a UE, according to an embodiment of the disclosure.

FIG. 2C illustrates a view for describing a method of performing cell reselection in a UE, according to an embodiment of the disclosure.

The UE may always perform inter-freq/RAT measurement on a high-priority frequency or RAT, regardless of a measured signal intensity of a serving cell. When the measured signal intensity of the serving cell is lower than SintaSearch 2c-25, the UE may perform intra-freq measurement. When the measured signal intensity of the serving cell is lower than SnonitraSearch 2c-30, the UE may perform inter-freq/RAT measurement on a frequency having the same priority as that of the current serving cell or a lower priority than that of the current serving cell. A reason of triggering UE measurement is to reduce power consumption of the UE, which is caused by measuring adjacent cells. When channel QoS of a cell 2c-10 of a high-priority frequency is higher than a predefined threshold value ThreshX-high 2c-35, the UE may reselect the cell 2c-10 of the high-priority frequency as a serving cell. When channel QoS of a cell 2c-00 of a low-priority frequency is higher than a predefined threshold value ThreshX-low 2c-15 and QoS of the serving cell is lower than ThreshServing-low 2c-20, the UE may reselect the cell 2c-00 of the low-priority frequency as a serving cell.

Upon cell reselection, the UE may consider RSRP or RSRQ. The RSRP or RSRQ means a value calculated by S-criteria. That is, the calculated value may be a parameter Srxlev or Squal, which is shown in Table 2 below.

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

TABLE 2

| | |
|---|---|
| Srxlev | Cell selection RX level value (dB) |
| Squal | Cell selection quality value (dB) |
| Qoffset$_{temp}$ | Offset temporarily applied to a cell as specified in TS 38.331 [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if QrxlevminoffsetcellSUL is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, Q$_{rxlevminoffsetcell}$ is present in SIB3 and SIB4 for the concerned cell, this cell specific offset is added to the corresponding Qrxlevmin to achieve the required minimum RX level in the concerned cell. |

TABLE 2-continued

| | |
|---|---|
| Q$_{qualmin}$ | Minimum required quality level in the cell (dB). Additionally, if Q$_{qualminoffsetcell}$ is signaled for the concerned cell, this cell specific offset is added to achieve the required minimum quality level in the concerned cell. |
| Q$_{rxlevminoffset}$ | Offset to the signaled Q$_{rxlevmin}$ taken into account in the Srxlev evaluation as a result of a periodic search for a higher priority PLMN while camped normally in a VPLMN, as specified in TS 23.122 [9]. |
| Q$_{qualminoffset}$ | Offset to the signaled Q$_{qualmin}$ taken into account in the Squal evaluation as a result of a periodic search for a higher priority PLMN while camped normally in a VPLMN, as specified in TS 23.122 [9]. |
| P$_{compensation}$ | If the UE supports the additionalPmax in the NR-NS-PmaxList, if present, in SIB1, SIB2 and SIB4: max(P$_{EMAX1}$ − P$_{PowerClass}$, 0) − (min(P$_{EMAX2}$, P$_{PowerClass}$) − min(P$_{EMAX1}$, P$_{PowerClass}$))(dB); else: max(P$_{EMAX1}$ − P$_{PowerClass}$, 0) (dB) |
| P$_{EMAX1}$, P$_{EMAX2}$ | Maximum TX power level of a UE may use when transmitting on the uplink in the cell (dBm) defined as P$_{EMAX}$ in TS 38.101 [15]. If UE supports SUL frequency for this cell, P$_{EMAX1}$ and P$_{EMAX2}$ are obtained from the p-Max for SUL in SIB1 and NR-NS-PmaxList for SUL respectively in SIB1, SIB2 and SIB4 as specified in TS 38.331 [3], else P$_{EMAX1}$ and P$_{EMAX2}$ are obtained from the p-Max and NR-NS-PmaxList respectively in SIB1, SIB2 and SIB4 for normal UL as specified in TS 38.331 [3]. |
| P$_{PowerClass}$ | Maximum RF output power of the UE (dBm) according to the UE power class as defined in TS 38.101-1 [15]. |

Figure 2D:
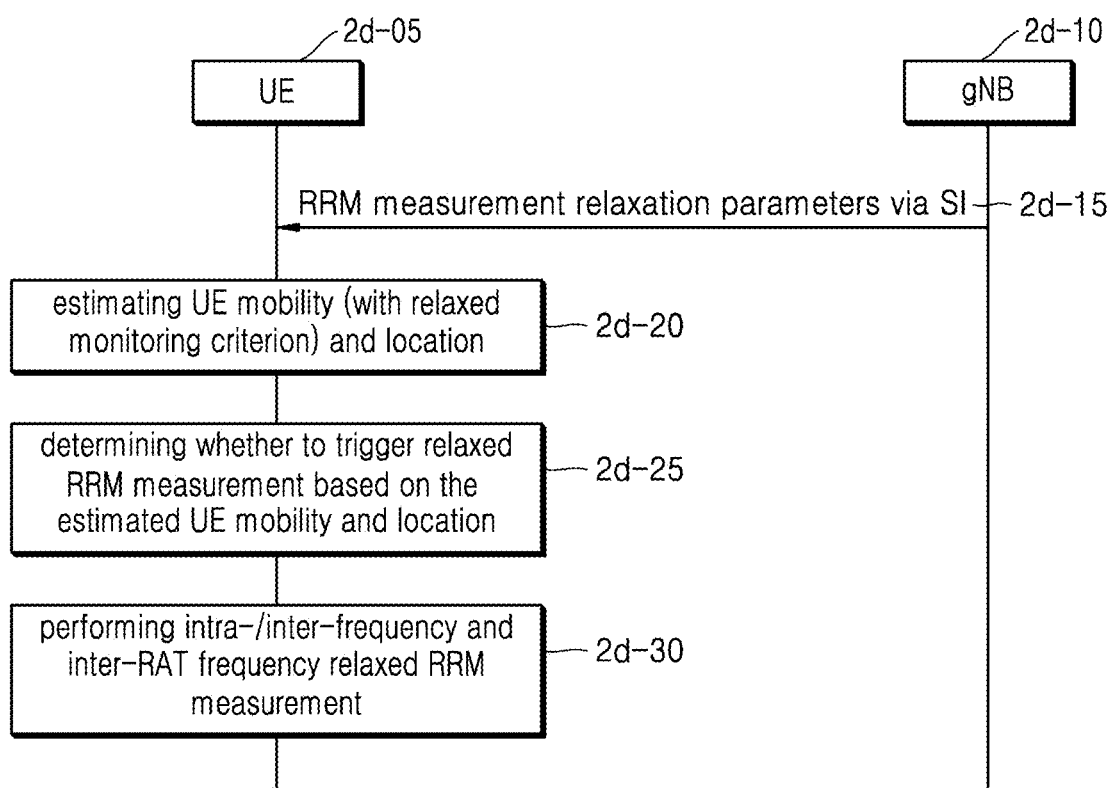
FIG. 2D illustrates a flowchart showing a process of performing relaxed RRM measurement, according to an embodiment of the disclosure.

FIG. 2D illustrates a flowchart showing a process of performing relaxed RRM measurement, according to the disclosure.

A UE 2d-05 may receive system information including configuration parameters required for estimating UE mobility and a UE location from a gNB 2d-10, in operation 2d-15. The system information may include configuration parameters related to relaxed RRM measurement. The configuration parameters may be included in a single SIB or transferred through a plurality of SIBs according to their uses. SIB1 may include an indicator indicating whether a cell corresponding to the gNB 2d-10 supports RRM measurement relaxation. Because SIB1 is always broadcasted and a UE needs to receive SIB1 when reselecting a cell, it will be reasonable that the indicator is included in the SIB1. When a UE received SIB1 supports a relaxed RRM measurement operation and the SIB1 includes the indicator, the UE will receive other SIBs including other configuration parameters to trigger the relaxed RRM measurement operation. The other SIBs except for SIB1 may have a characteristic of being broadcasted on demand without being always broadcasted, unlike SIB1.

As another method, parameters related to relaxed monitoring criterion used to estimate UE mobility and a UE location may be included in SIB1 and transferred to the EE 2d-05. In this case, because the parameters function as the indicator, the method may not require the indicator. The configuration parameters will be described in detail, later.

The UE 2d-05 may apply the configuration parameters provided from the gNB 2d-10 to a predefined equation to determine whether the UE stops or is moving at low speed and whether the UE is in a cell edge, in operation 2d-25. In the current embodiment of the disclosure, the following Equation 1 may be applied to estimate the UE mobility.

$$(Srxlev_{Ref} - Srxlev) < S_{SearchDeltaP} \quad \text{[Equation 1]}$$

Also, the following Equation 2 may be applied to determine whether the UE 2d-05 is in the cell edge. The Equation 2 may consider various options, and, in the disclosure, one of the following options may be applied.

Option 1:

$$Srxlev_{Ref} > S_{SearchDeltaP} + Q_{offsetRelaxed}$$

Option 2:

$$Srxlev > Q_{offsetRelaxed}$$

Option 3:

$$Srxlev > SrelaxedIntraSearchP \text{ and}$$

$$Squal > SrelaxedIntraSearchQ$$

Option 4:

$$Q_{rxlevmeas} > SrelaxedIntraSearchP$$

Option 5:

$$Q_{rxlevmeas} > SrelaxedIntraSearchP$$

$$Q_{qualmeas} > SrelaxedIntraSearchQ \quad \text{[Equation 2]}$$

As there are SintraSearch corresponding to intra-frequencies and SnonintraSearch corresponding to inter-frequencies, the Equation 2 may also provide a parameter corresponding to each of intra-frequencies or inter-frequencies. For example, SrelaxedIntraSearchP and SrelaxedIntraSearchQ may be applied to the Equation 2 to determine inter-frequencies measurement relaxation, and SrelaxedInterSearchP and SrelaxedInterSearchQ may be applied to the Equation 2 to determine inter-frequencies measurement relaxation. However, in the disclosure, a case of applying the Equation 2 without differentiating intra-frequencies from inter-frequencies may also be considered.

In the Equations 1 and 2, parameters may be defined as follows.

Srxlev=current Srxlev value of the serving cell (dB).
Srxlev$_{Ref}$=reference Srxlev value of the serving cell (dB), set as follows:
  After selecting or reselecting a new cell, or
  If (Srxlev−Srxlev$_{Ref}$)>0, or
  After switching RRC_INACTIVE to RRC_IDLE, or
  If the relaxed monitoring criterion has not been met for T$_{SearchDeltaP}$:
    the UE shall set the value of Srxlev$_{Ref}$ to the current Srxlev value of the serving cell;
T$_{SearchDeltaP}$=X minutes, or the eDRX cycle length if eDRX is configured and the eDRX cycle length is longer than X minutes.
Q$_{offsetRelaxed}$=offset used to derive the relaxed monitoring criterion (dB)
SrelaxedIntraSearchP=Minimum required RX level to indicate that UE is not in cell edge (dBm). It is applicable for relaxed intra-frequencies measurement only
SrelaxedIntraSearchQ=Minimum required quality level to indicate that UE is not in cell edge (dB). It is applicable for relaxed intra-frequencies measurement only
SrelaxedInterSearchP=Minimum required RX level to indicate that UE is not in cell edge (dBm). It is applicable for relaxed inter-frequencies measurement only
SrelaxedInterSearchQ=Minimum required quality level to indicate that UE is not in cell edge (dB). It is applicable for relaxed inter-frequencies measurement only
Q$_{rxlevmeas}$=Measured cell RX level value (RSRP)

Values of configuration parameters related to relaxed measurement, such as S$_{SearchDeltaP}$ and T$_{SearchDeltaP}$, may have been defined in advance, or may be configured through system information or dedicated signaling from the gNB 2d-10. The configuration parameters related to relaxed measurement may additionally include a validity timer and a validity condition of the above-described configuration parameters. For example, the validity timer may start when a configuration parameter is received from the gNB 2d-10, and, when the validity timer is expired, it may be regarded that the configuration parameter is no longer valid. The validity timer may stop when the UE 2d-05 enters a connection mode.

The UE 2d-05 may determine whether to perform intra-/inter-/inter-RAT frequency relaxed RRM measurement based on results derived from at least one of the Equation 1 or 2, in operation 2d-25, and, at this time, the UE 2d-05 may apply a longer measurement period than in a normal RRM measurement operation or reduce the number of cells or frequencies which need to be measured, thereby reducing consumption power of the UE 2d-05, in operation 2d-30.

As described above, the gNB 2d-10 may provide the UE 2d-05 with frequency priority information by using system information or dedicated signaling (for example, an RRC Release message). The reason of providing the frequency priority information may be to reflect a network deployment/policy such as load balancing. Accordingly, the UE 2d-05 may need to continue to measure a frequency having a higher priority than that of a serving cell on which the UE 2d-05 currently camps. Accordingly, in the disclosure, a normal RRM measurement operation, instead of a relaxed measurement operation, may be performed on a frequency having a higher priority than that of the serving cell on which the UE 2d-05 currently camps, although the relaxed monitoring criterion is fulfilled. Accordingly, when the UE 2d-05 receives frequency priority information through system information or a dedicated signaling message and a frequency having a higher priority than that of the serving cell on which the UE 2d-05 currently camps exists among frequencies in which the frequency priority information is configured, the UE 2d-05 may need to perform a normal RRM measurement operation on the corresponding frequency regardless of whether the relaxed monitoring criterion is fulfilled. Also, the gNB 2d-10 may selectively configure whether to always perform a normal RRM measurement operation on the frequency having the higher priority, through the dedicated signaling.

In the disclosure, in regard of the measurement operation for reducing UE consumption power, the SintraSearch and SnonintraSearch are referred to as a first configuration information, and an operation of applying the first configuration information to determine whether to perform intra-frequency or inter-frequency cell measurement is referred to as a first operation. Content described above with reference to FIG. 2C may be applied to the first operation. Also, configuration parameters related to the above-described relaxed measurement is referred to as a second configuration information, and an operation of applying the second configuration information to determine whether to perform relaxed intra-frequency or inter-frequency cell measurement is referred to as a second operation. The second configuration information may be classified into parameters related to the Equation 1 and parameters related to the Equation 2. In the disclosure, the parameters related to the Equation 1 are referred to as a configuration 2-1, the parameters related to the Equation 2 are referred to as a configuration 2-2, and Equation used to determine whether to perform relaxed intra-frequency or inter-frequency cell measurement may be determined according to whether the configuration 2-1 or the configuration 2-2 is provided.

That is, when the configuration 2-1 is provided, the UE 2d-05 may consider the Equation 1, and, when the configuration 2-2 is provided, the EE 2d-05 may consider the Equation 2, to determine whether to perform relaxed intra-frequency or inter-frequency cell measurement. Also, when both the configuration 2-1 and the configuration 2-2 are provided, the EE 2d-05 may consider both the Equation 1 and Equation 2 to determine whether to perform relaxed intra-frequency or inter-frequency cell measurement.

As the first configuration information provides SintraSearch corresponding to intra-frequencies and SnonintraSearch corresponding to inter-frequencies, the second configuration information may also provide a parameter corresponding to each of the intra-frequencies or inter-frequencies. For example, SrelaxedIntraSearchP and SrelaxedIntraSearchQ may be applied to the Equation 2 to determine intra-frequencies measurement relaxation, and SrelaxedInterSearchP and SrelaxedInterSearchQ may be applied to the Equation 2 to determine inter-frequencies measurement relaxation.

Figure 2E:
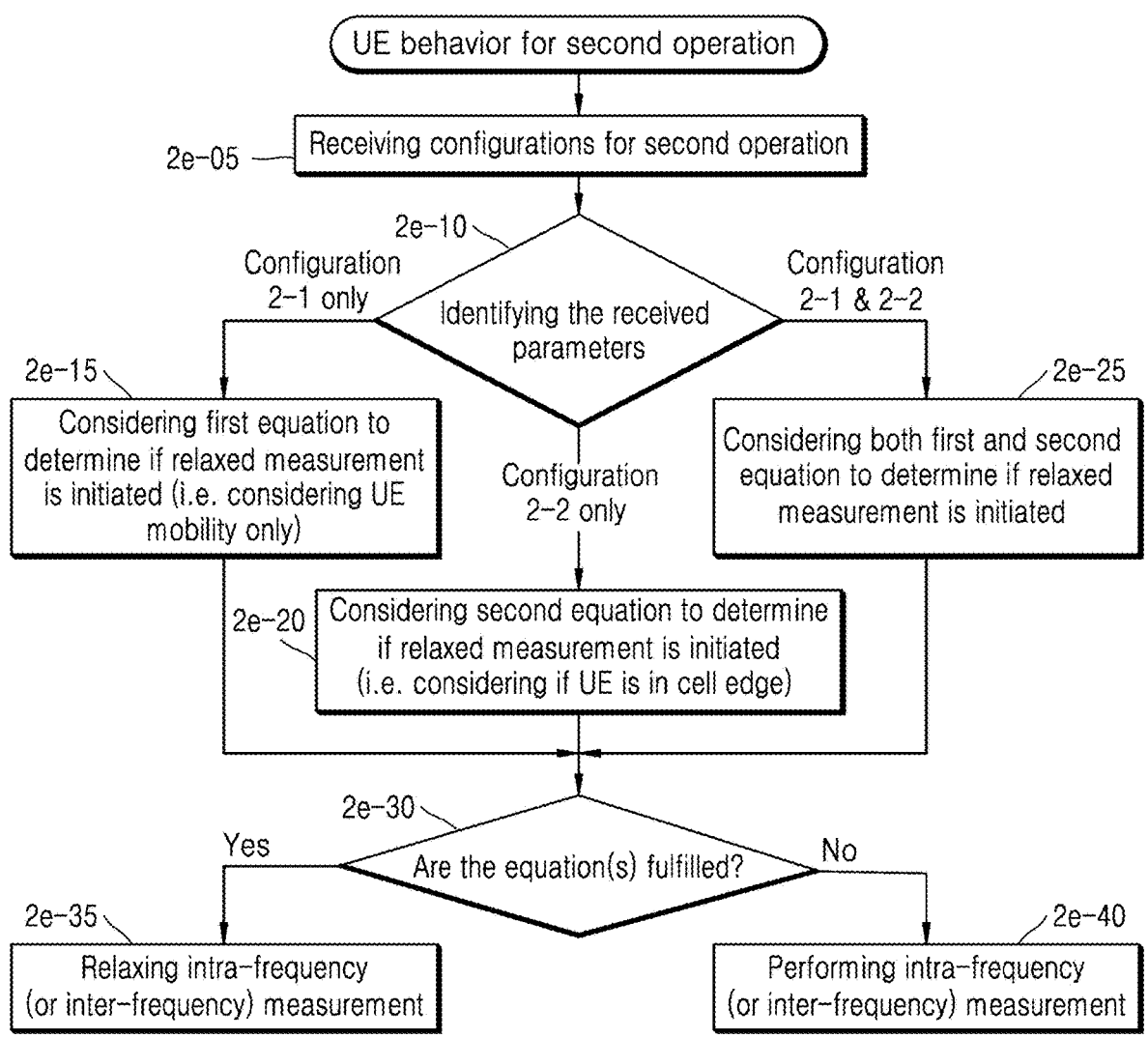
FIG. 2E illustrates a flowchart showing a UE behavior, according to an embodiment of the disclosure.

FIG. 2E illustrates a flowchart showing a UE behavior for the second operation, according to the disclosure.

The UE may receive configuration parameters for the second operation from a serving cell, in operation 2e-05. The configuration parameters may be provided to the UE through system information or a dedicated RRC message. For example, the dedicated RRC message may be an RRC Release message transmitted from a gNB to switch the UE to an idle mode or an inactive mode. When the configuration parameters are provided through the dedicated RRC message, a validity timer may start. A value of the validity timer may also be provided through the dedicated RRC message. When the validity timer is expired, the configuration parameters may be no longer valid. The validity timer may stop when the UE enters a connection mode.

In operation 2e-10, the UE may determine or identify attributes of the configuration parameters.

In operation 2e-15, when the configuration 2-1 is provided, the UE may consider the Equation 1 to determine whether to perform measurement relaxation.

In operation 2e-20, when the configuration 2-2 is provided, the UE may consider the Equation 2 to determine whether to perform measurement relaxation.

In operation 2e-25, when both the configuration 2-1 and configuration 2-2 are provided, the UE may consider both the Equation 1 and Equation 2 to determine whether to perform measurement relaxation.

In operation 2e-30, the UE may determine or identify whether the Equation(s) is fulfilled.

In operation 2e-35, when the Equation(s) is fulfilled, the UE may perform intra-frequencies or inter-frequencies measurement relaxation to reduce UE consumption power.

In operation 2e-40, when the Equation(s) is not fulfilled, the UE may perform normal intra-frequencies or inter-frequencies measurement.

Figure 2F:
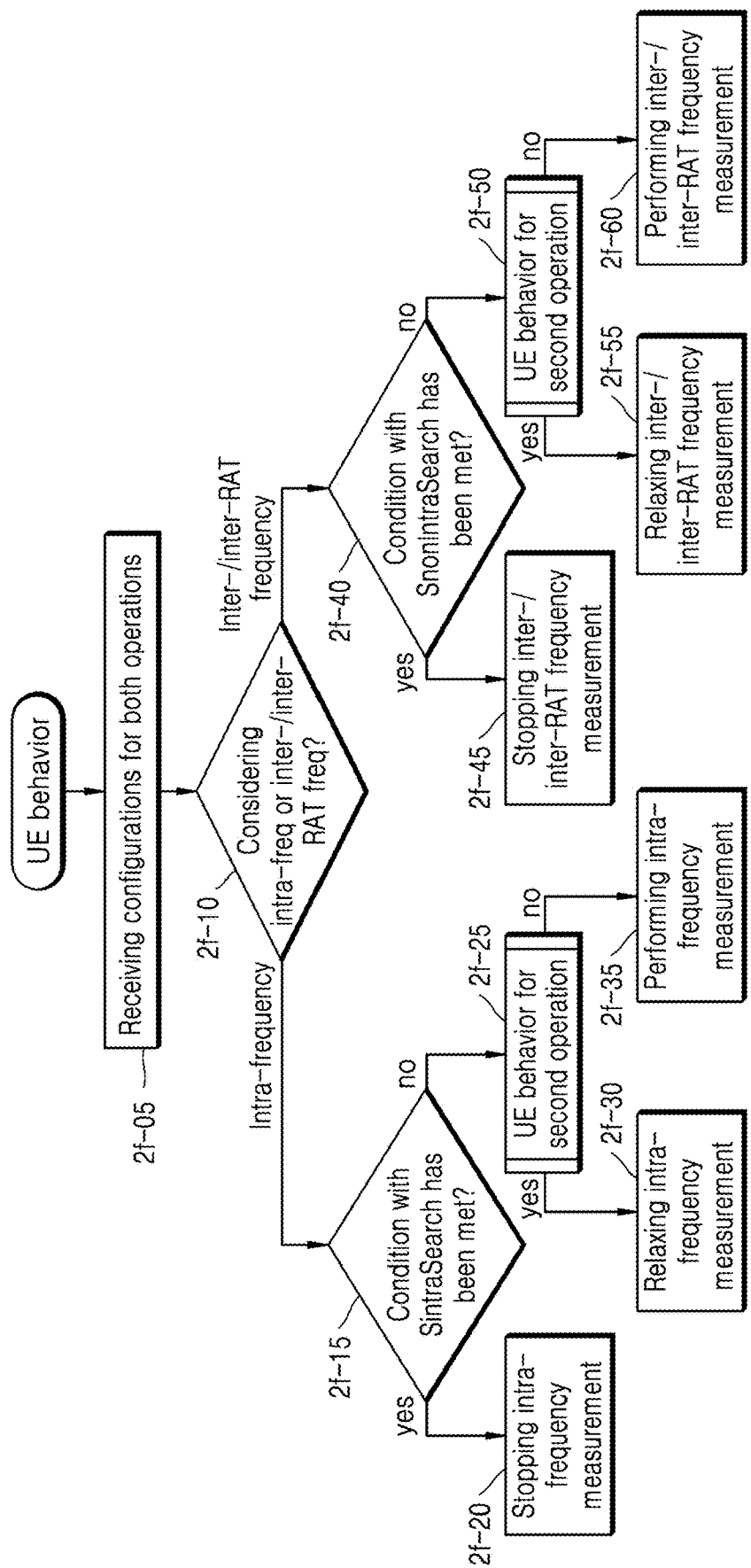
FIG. 2F illustrates a flowchart showing a process of stepwise performance of a first operation and a second operation, according to an embodiment of the disclosure.

FIG. 2F illustrates a flowchart showing a process of stepwise performance of the first operation and the second operation, according to the disclosure.

The first operation and the second operation as described above may be configured simultaneously. In the disclosure, when the first operation and the second operation are configured simultaneously, the first operation and the second operation may be performed in this order. The first operation may stop intra-frequencies or inter-frequencies measurement, which most greatly reduces UE consumption power. In contrast, the second operation may provide a lower effect than the first operation. Accordingly, the UE may determine whether to stop intra-frequencies or inter-frequencies measurement through the first operation, and, when the UE fails to stop intra-frequencies or inter-frequencies measurement, the UE may reduce UE consumption power through the second operation.

In operation 2f-05, the UE may receive configuration parameters related to the first operation and the second operation from a serving cell.

In operation 2f-10, the UE may determine or identify whether to consider intra-frequencies or inter-frequencies measurement.

In operation 2f-15, when the UE considers intra-frequencies measurement, the UE may determine or identify whether to be capable of stopping intra-frequencies measurement through the first operation.

In operation 2f-20, when a condition for the first operation is fulfilled, the UE may stop intra-frequencies measurement.

In operation 2f-25, when the UE fails to stop intra-frequencies measurement, the UE may determine or identify whether to be capable of performing intra-frequencies measurement relaxation through the second operation.

In operation 2f-30, when a condition for the second operation is fulfilled, the UE may perform intra-frequencies measurement relaxation.

In operation 2f-35, when the UE fails to perform intra-frequencies measurement relaxation, the UE may perform intra-frequencies measurement.

In operation 2f-40, when the UE considers inter-frequencies measurement, the UE may determine or identify whether to be capable of stopping inter-frequencies measurement through the first operation.

In operation 2f-45, when the condition for the first operation is fulfilled, the UE may stop inter-frequencies measurement.

In operation 2f-50, when the UE fails to stop inter-frequencies measurement, the UE may determine or identify whether to be capable of performing inter-frequencies measurement relaxation through the second operation.

In operation 2f-55, when the condition for the second operation is fulfilled, the UE may perform inter-frequencies measurement relaxation.

In operation 2f-60, when the UE fails to perform inter-frequencies measurement relaxation, the UE may perform inter-frequencies measurement.

A gNB may configure a frequency range (FR) to which relaxed measurement is applied.

The gNB may configure relaxed measurement for UEs in a cell or specific UEs through system information or a dedicated RRC message, and simultaneously, configure a FR capable of performing the relaxed measurement. In a frequency belonging to the FR, relaxed measurement may be performed when Equation for the second operation is fulfilled.

The UE may receive a configuration information for relaxed measurement from system information or a dedicated RRC message broadcasted from the gNB. The UE may determine or identify whether the configuration information includes information about a FR capable of performing the relaxed measurement. When the configuration information includes the information about the FR and the Equation for the second operation is fulfilled, the UE may perform relaxed measurement on a frequency belonging to the FR.

The gNB may configure an RRC state of a UE capable of performing relaxed measurement.

The gNB may configure relaxed measurement for UEs in a cell or specific UEs through system information or a dedicated RRC message, and simultaneously, configure an RRC state capable of performing the relaxed measurement. When the UE is in the RRC state and the Equation for the second operation is fulfilled, the EE may perform relaxed measurement. The RRC state may be RRC_IDLE or RRC_INACTIVE. When the information about the FR is not provided, the EE may be capable of performing relaxed measurement in both of the two RRC states.

The EE may receive a configuration information for relaxed measurement from system information or a dedicated RRC message broadcasted from the gNB. The EE may determine or identify whether the configuration information includes information about an RRC state capable of performing the relaxed measurement. When the configuration information includes the information about the RRC state, a current RRC state of the EE is identical to the configured RRC state, and the Equation for the second operation is fulfilled, the EE may perform relaxed measurement.

Figure 2G:
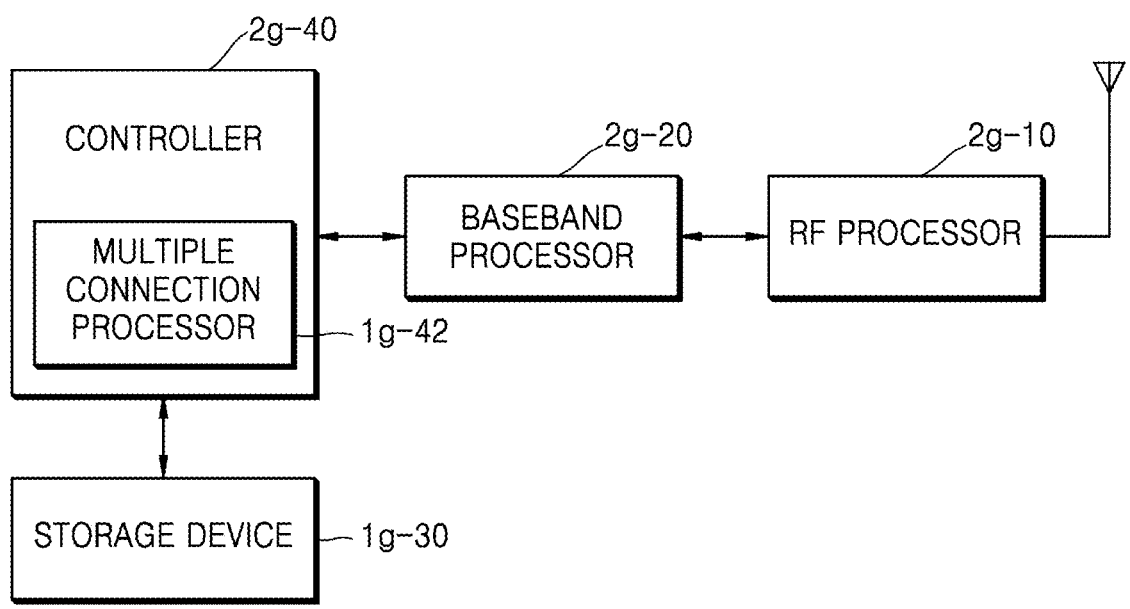
FIG. 2G illustrates a block diagram showing an internal structure of a UE according to an embodiment of the disclosure.

FIG. 2G illustrates a block diagram showing an internal structure of a UE, according to the disclosure.

Referring to FIG. 2G, the UE may include a radio frequency (RF) processor 2g-10, a baseband processor 2g-20, a storage device 2g-30, and a controller 2g-40.

The RF processor 2g-10 may perform functions for transmitting and receiving signals through a wireless channel, such as signal band conversion, signal amplification, etc. That is, the RF processor 2g-10 may up-convert a baseband signal provided from the baseband processor 2g-20 into an RF band signal and then transmit the RF band signal through an antenna. Also, the RF processor 2g-10 may down-convert a RF band signal received through the antenna into a baseband signal. For example, the RF processor 2g-10 may include a transmission filter, a reception filter, an amplifier, a mixer, an oscillator, a digital to analog convertor (DAC), an analog to digital convertor (ADC), etc. In FIG. 2G, a single antenna is shown, however, the UE may include a plurality of antennas. Also, the RF processor 2g-10 may include a plurality of RF chains. Furthermore, the RF processor 2g-10 may perform beamforming. For beamforming, the RF processor 2g-10 may adjust phases and magnitudes of signals that are transmitted and received through the plurality of antennas or antenna elements. Also, the RF processor 2g-10 may perform Multi Input Multi Output (MIMO), and when a MIMO operation is performed, the RF processor 2g-10 may receive several layers.

The baseband processor 2g-20 may perform a function for conversion between baseband signals and bit streams according to a physical layer standard of a system. For example, upon data transmission, the baseband processor 2g-20 may encipher and modulate a transmission bit stream to generate complex symbols. Also, upon data reception, the baseband processor 2g-20 may demodulate and decipher a baseband signal provided from the RF processor 2g-10 to restore a reception bit stream. For example, according to an OFDM method, upon data transmission, the baseband processor 2g-20 may encipher and modulate a transmission bit stream to generate complex symbols, map the complex symbols to subcarriers, and then construct OFDM symbols through inverse fast Fourier transform (IFFT) and cyclic prefix (CP) insertion. Also, upon data reception, the baseband processor 2g-20 may segment a baseband signal provided from the RF processor 2g-10 in units of OFDM symbols, restore signals mapped to subcarriers through fast Fourier transform (FFT), and then restore a reception bit stream through demodulation and deciphering.

The baseband processor 2g-20 and the RF processor 2g-10 may transmit and receive signals as described above. Accordingly, the baseband processor 2g-20 and the RF processor 2g-10 are also referred to as a transmitter, a receiver, a transceiver, or a communicator. Furthermore, at least one of the baseband processor 2g-20 or the RF processor 2g-10 may include a plurality of communication modules to support a plurality of different air interface technologies. Also, at least one of the baseband processor 2g-20 or the RF processor 2g-10 may include different communication modules to process signals of different frequency bands. For example, the different air interface technologies may include a wireless LAN (for example, IEEE 802.11), a cellular network (for example, LTE), etc. Also, the different frequency bands may include a super high frequency (SHF) (e.g., from 3 GHz to 30 GHz) band and a millimeter wave (e.g., 60 GHz) band.

The storage device 2g-30 may store data, such as basic programs, application programs, and configurations, for operations of the UE. Particularly, the storage device 2g-30 may store information related to a second connection node that performs wireless communications by using a second air interface technology. The storage device 2g-30 may provide the stored data according to a request from the controller 2g-40.

The controller 2g-40 may control overall operations of the UE. For example, the controller 2g-40 may transmit and receive signals through the baseband processor 2g-20 and the RF processor 2g-10. Also, the controller 2g-40 may write data in the storage device 2g-30 or read data from the storage device 2g-30. To write or read data, the controller 2g-40 may include at least one processor. For example, the controller 2g-40 may include a communication processor CP for performing control for communication, and an application processor AP for controlling an upper layer of an application program, etc. Also, the controller 2g-40 may further include a multiple connection processor 2g-42 for supporting multiple connections.

Figure 2H:
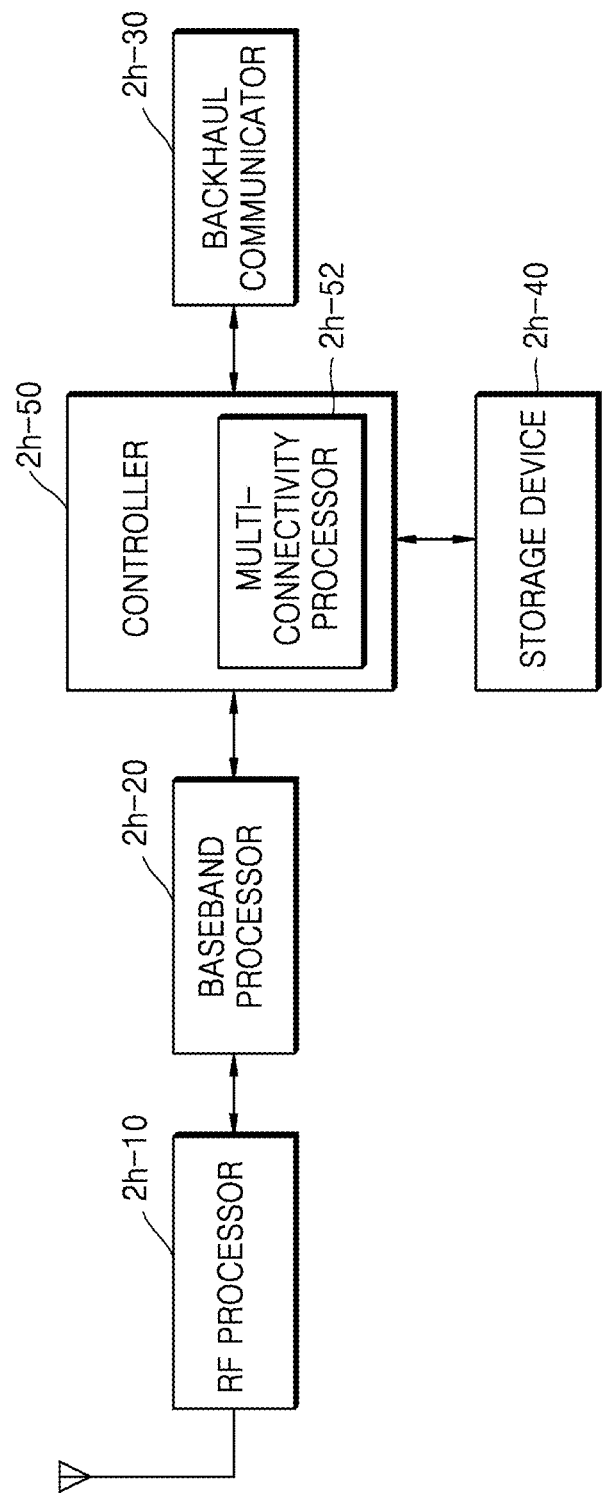
FIG. 2H illustrates a block diagram showing a configuration of a next-generation node B (gNB) according to an embodiment of the disclosure.

FIG. 2H illustrates a block diagram showing a configuration of a gNB according to the disclosure.

As shown in FIG. 2H, the gNB may include a RF processor 2h-10, a baseband processor 2h-20, a backhaul communicator 2h-30, a storage device 2h-40, and a controller 2h-50.

The RF processor 2h-10 may perform a function for transmitting and receiving signals through a wireless channel, such as signal band conversion, signal amplification, etc. That is, the RF processor 2h-10 may up-convert a baseband signal provided from the baseband processor 2h-20 into a RF band signal, transmit the RF band signal through an antenna, and down-convert an RF band signal received through the antenna into a baseband signal. For example, the RF processor 2h-10 may include a transmission filter, a reception filter, an amplifier, a mixer, an oscillator, a DAC, an ADC, etc. In FIG. 2H, a single antenna is shown, however, the gNB may include a plurality of antennas. Also, the RF processor 2h-10 may include a plurality of RF chains.

Furthermore, the RF processor 2h-10 may perform beamforming. For beamforming, the RF processor 2h-10 may adjust phases and magnitudes of signals that are transmitted/ received through the plurality of antennas or antenna elements. The RF processor 2h-10 may perform a downlink MIMO operation by transmitting one or more layers.

The baseband processor 2h-20 may perform a function for conversion between baseband signals and bit streams according to a physical layer specification of a first air interface technology. For example, upon data transmission, the baseband processor 2h-20 may encipher and modulate a transmission bit stream to generate complex symbols. Also, upon data reception, the baseband processor 2h-20 may demodulate and decipher a baseband signal provided from the RF processor 2h-10 to restore a reception bit stream. For example, according to the OFDM method, upon data transmission, the baseband processor 2h-20 may encipher and modulate a transmission bit stream to generate complex symbols, map the complex symbols to subcarriers, and then construct OFDM symbols through IFFT and CP insertion. Also, upon data reception, the baseband processor 2h-20 may segment a baseband signal provided from the RF processor 2h-10 in units of OFDM symbols, restore signals mapped to subcarriers through FFT, and then restore a reception bit stream through demodulation and deciphering. The baseband processor 2h-20 and the RF processor 2h-10 may transmit and receive signals as described above. Accordingly, the baseband processor 2h-20 and the RF processor 2h-10 are also referred to as a transmitter, a receiver, a transceiver, a communicator, or a wireless communicator.

The backhaul communicator 2h-30 may provide an interface for communicating with other nodes in a network. That is, the backhaul communicator 2h-30 may convert a bit stream that is transmitted from the gNB to another node (for example, a secondary base station, a core network, etc.) into a physical signal, and convert a physical signal received from another node into a bit stream.

The storage device 2h-40 may store data, such as basic programs, application programs, and configurations, for operations of the gNB. Particularly, the storage device 2h-40 may store information about a bearer assigned to a UE connected to the gNB, a measurement result reported from the connected UE, etc. Also, the storage device 2h-40 may store information that is used as a determination criterion about whether to provide multiple connections to the UE or whether to release multiple connections to the UE. Also, the storage device 2h-40 may provide the stored data according to a request from the controller 2h-50.

The controller 2h-50 may control overall operations of the gNB. For example, the controller 2h-50 may transmit and receive signals through the baseband processor 2h-20 and the RF processor 2h-10 or through the backhaul communicator 2h-30. Also, the controller 2h-50 may write data in the storage device 2h-40 or read data from the storage device 2h-40. To write or read data, the controller 2h-50 may include at least one processor. Also, the controller 2h-50 may further include a multiple connection processor 2h-52 for supporting multiple connections.

According to various embodiments of the disclosure, it may be possible to reduce UE power consumption for measurement through a stepwise measurement operation of the UE. Also, according to the embodiments of the disclosure, by separately providing parameters for relaxed intra-frequencies measurement and parameters for relaxed inter-frequencies measurement, UE power consumption may be efficiently reduced.

The methods according to the embodiments of the disclosure described in claims or specification thereof may be implemented in hardware, software, or a combination of hardware and software.

When the methods are implemented in software, a computer-readable storage medium or a computer program product storing at least one program (software module) may be provided. The at least one program stored in the computer-readable storage medium or the computer program product may be configured for execution by at least one processor within an electronic device. The at least one program may include instructions that cause the electronic device to execute the methods according to the embodiments of the disclosure described in the claims or specification thereof.

The program (software module or software) may be stored in RAM, a non-volatile memory including a flash memory, ROM, an electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wide LAN (WLAN), or a storage area network (SAN) or a communication network configured in a combination thereof. The storage device may access a device performing the embodiments of the disclosure through an external port. Further, a separate storage device on the communication network may also access the device performing the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience of description, and the disclosure is not limited to the singular or plural form. A component expressed in a plural form may be configured as a single component, or a component expressed in a singular form may be configured as a plurality of components.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Accordingly, it is to be construed that all modifications or modified forms derived from the disclosure, in addition to the above-described embodiments of the disclosure, are encompassed within the scope of the disclosure. Also, the embodiments may be combined and used as needed. For example, a part of an embodiment of the disclosure may be combined with a part of another embodiment of the disclosure. Also, the embodiments of the disclosure may be applied to other systems (for example, an LTE system, a 5G or NR system, etc.), and other modified examples based on the technical concept of the embodiments may also be executed.

What is claimed is:

1. A method for performing a frequency measurement by a terminal in a wireless communication system, the method comprising:

receiving, from a base station, system information comprising first configuration information associated with a frequency measurement and second configuration information associated with a relaxed frequency measurement, wherein the second configuration information comprises an evaluation time $T_{SearchdeltaP}$ for evaluating a low mobility criterion for the terminal with low mobility;

receiving, from the base station, an indicator indicating whether a frequency measurement for a higher priority frequency having a higher priority than a frequency of a serving cell of the terminal is allowed to be relaxed;

determining whether to perform the frequency measurement on at least one frequency based on the first configuration information;

based on determining to perform the frequency measurement on the at least one frequency, determining whether to perform the relaxed frequency measurement for the at least one frequency, based on the indicator and the second configuration information by determining whether the low mobility criterion is fulfilled during the evaluation time $T_{SearchDeltaP}$; and performing the relaxed frequency measurement for the at least one frequency based on a result of the determining whether to perform the relaxed frequency measurement.

2. The method of claim 1, wherein the first configuration information associated with the frequency measurement comprises at least one of a threshold value $S_{IntraSearchP}$ for a cell selection receive level value (Srxlev) for an intra-frequency, a threshold value $S_{IntraSearchQ}$ for a cell selection quality value (Squal) for the intra-frequency, a threshold value $S_{nonIntraSearchP}$ for the Srxlev for an inter-frequency or an inter-radio access technology (inter-RAT) frequency, or a threshold value $S_{nonIntraSearchQ}$ for the Squal for the inter-frequency or the inter-RAT frequency.

3. The method of claim 2, wherein the determining whether to perform frequency measurement on the at least one frequency based on the first configuration information comprises determining not to perform frequency measurement for the intra-frequency in case that an Srxlev of the serving cell of the terminal is greater than the $S_{IntraSearchP}$ and an Squal of the serving cell is greater than the $S_{IntraSearchQ}$.

4. The method of claim 2, wherein the determining whether to perform frequency measurement on the at least one frequency based on the first configuration information comprises determining not to perform frequency measurement for the inter-frequency or the inter-RAT frequency in case that an Srxlev of the serving cell of the terminal is greater than the $S_{nonIntraSearchP}$ and an Squal of the serving cell is greater than the $S_{nonIntraSearchQ}$.

5. The method of claim 1, wherein the second configuration information for the relaxed frequency measurement further comprises at least one of third configuration information associated with the low mobility criterion or fourth configuration information associated with a not at cell edge criterion for the terminal not at cell edge, wherein the third configuration information comprises a threshold value $S_{SearchDeltaP}$ for variation of a cell selection receive level value (Srxlev), and wherein the fourth configuration information comprises at least one of a threshold value $S_{SearchThresholdP}$ for the Srxlev for the relaxed frequency measurement or a threshold value $S_{SearchThresholdQ}$ for a cell selection quality value (Squal) for the relaxed frequency measurement.

6. The method of claim 5, wherein the low mobility criterion is that a value obtained by subtracting an Srxlev of a serving cell of the terminal from a reference Srxlev ($Srxlev_{Ref}$) of the serving cell is less than the $S_{SearchDeltaP}$, and wherein the not at cell edge criterion is that the Srxlev of the serving cell is greater than the $S_{SearchThresholdP}$ and that in case that the $S_{SearchThresholdQ}$ is included in the fourth configuration information, an Squal of the serving cell is greater than the $S_{SearchThresholdQ}$.

7. The method of claim 6, wherein a current Srxlev of the serving cell is determined as the $Srxlev_{Ref}$ of the serving cell in case that the terminal selects or reselects a new cell, the current Srxlev of the serving cell is greater than a current reference $Srxlev_{Ref}$ of the serving cell, or at least one criterion of the low mobility criterion or the not at cell edge criterion is not satisfied during the evaluation time $T_{SearchDeltaP}$.

8. The method of claim 5, wherein the determining whether to perform the relaxed frequency measurement for the at least one frequency based on the second configuration information further comprises:

in case that the third configuration information is included in the second configuration information and the fourth configuration information is not included, determining whether to perform the relaxed frequency measurement for the at least one frequency based on whether the low mobility criterion is satisfied, in case that the third configuration information is not included in the second configuration information and the fourth configuration information is included, determining whether to perform the relaxed frequency measurement for the at least one frequency based on whether the not at cell edge criterion is satisfied, and in case that the third configuration information and the fourth configuration information are included in the second configuration information, determining whether to perform the relaxed frequency measurement for the at least one frequency based on whether at least one criterion of the low mobility criterion or the not at cell edge criterion is satisfied.

9. The method of claim 1, wherein the performing the relaxed frequency measurement for the at least one frequency comprises performing the relaxed frequency measurement for the at least one frequency based on a first measurement period for the relaxed frequency measurement, and wherein the first measurement period is longer than a second measurement period for the frequency measurement that is unrelaxed.

10. A terminal performing frequency measurement in a wireless communication system, the terminal comprising:
a transceiver; and
at least one processor configured to:
receive, from a base station, by controlling the transceiver, system information comprising first configuration information associated with a frequency measurement and second configuration information associated with a relaxed frequency measurement, wherein the second configuration information comprises an evaluation time $T_{SearchdeltaP}$ for evaluating a low mobility criterion for the terminal with low mobility, receive, from the base station, by controlling the transceiver, an indicator indicating whether a frequency measurement for a higher priority frequency having a higher priority than a frequency of a serving cell of the terminal is allowed to be relaxed, determine whether to perform the frequency measurement on at least one frequency based on the first configuration information, based on determining to perform the frequency measurement on the at least one frequency, determine whether to perform the relaxed frequency measurement for the at least one frequency, based on the indicator and the second configuration information by determining whether the low mobility criterion is fulfilled during the evaluation time $T_{SearchDeltaP}$, and perform the relaxed frequency measurement for the at least one frequency based on a result of the determining whether to perform the relaxed frequency measurement.

11. The terminal of claim 10, wherein the second configuration information for the relaxed frequency measurement further comprises at least one of third configuration information associated with the low mobility criterion or fourth configuration information associated with a not at cell edge criterion for the terminal not at cell edge, wherein the third configuration information comprises a threshold value $S_{SearchDeltaP}$ for variation of a cell selection receive level value (Srxlev), and wherein the fourth configuration information comprises at least one of a threshold value $S_{SearchThresholdP}$ for the Srxlev for the relaxed frequency measurement or a threshold value $S_{SearchThresholdQ}$ for a cell selection quality value (Squal) for the relaxed frequency measurement.

12. The terminal of claim 11, wherein the low mobility criterion is that a value obtained by subtracting an Srxlev of the serving cell of the terminal from a reference Srxlev ($Srxlev_{Ref}$) of the serving cell is less than the $S_{SearchDeltaP}$, wherein the not at cell edge criterion is that the Srxlev of the serving cell is greater than the $S_{SearchThresholdP}$ and that in case that the $S_{SearchThresholdQ}$ is included in the fourth configuration information, an Squal of the serving cell is greater than the $S_{SearchThresholdQ}$, and wherein a current Srxlev of the serving cell is determined as the $Srxlev_{Ref}$ of the serving cell in case that the terminal selects or reselects a new cell, the current Srxlev of the serving cell is greater than a current reference $Srxlev_{Ref}$ of the serving cell, or at least one criterion of the low mobility criterion or the not at cell edge criterion is not satisfied during the evaluation time $T_{SearchDeltaP}$.

13. The terminal of claim 11, wherein the at least one processor is further configured to:

in case that the third configuration information is included in the second configuration information and the fourth configuration information is not included, determine whether to perform the relaxed frequency measurement for the at least one frequency based on whether the low mobility criterion is satisfied, in case that the third configuration information is not included in the second configuration information and the fourth configuration information is included, determine whether to perform the relaxed frequency measurement for the at least one frequency based on whether the not at cell edge criterion is satisfied, and in case that the third configuration information and the fourth configuration information are included in the second configuration information, determine whether to perform the relaxed frequency measurement for the at least one frequency based on whether at least one criterion of the low mobility criterion or the not at cell edge criterion is satisfied.

* * * * *